(12) United States Patent
McCullough

(10) Patent No.: US 9,097,048 B2
(45) Date of Patent: Aug. 4, 2015

(54) HINGE MECHANISMS AND FOLDABLE FURNITURE

(71) Applicant: FlatZen, Inc., Pasadena, CA (US)

(72) Inventor: Barry McCullough, Pasadena, CA (US)

(73) Assignee: FlatZen, Inc., Pasadena, CA (US)

( * ) Notice: Subject to any disclaimer, the term of this patent is extended or adjusted under 35 U.S.C. 154(b) by 0 days.

(21) Appl. No.: 14/457,647

(22) Filed: Aug. 12, 2014

(65) Prior Publication Data

US 2015/0048656 A1     Feb. 19, 2015

Related U.S. Application Data

(60) Provisional application No. 61/865,339, filed on Aug. 13, 2013, provisional application No. 61/899,630, filed on Nov. 4, 2013, provisional application No. 62/007,050, filed on Jun. 3, 2014.

(51) Int. Cl.
    *E05D 5/16*          (2006.01)
    *E05D 11/10*       (2006.01)
    (Continued)

(52) U.S. Cl.
    CPC ............. *E05D 11/1007* (2013.01); *A47B 3/08* (2013.01); *A47C 4/04* (2013.01); *B25H 1/00* (2013.01);
    (Continued)

(58) Field of Classification Search
    CPC ............. E05D 1/04; E05D 3/04; E05D 5/128; E05D 5/14; E05D 5/16; E05D 11/1007; E05D 11/1014; E05D 11/1028; Y10T 16/54; Y10T 16/5406; Y10T 16/544; Y10T 16/5443; Y10T 16/5444; Y10T 16/5445; Y10T 16/5535
    USPC ........... 16/319, 348, 357, 358, 359, 360, 381, 16/229, 230, 316, 386
    See application file for complete search history.

(56) References Cited

U.S. PATENT DOCUMENTS 1,868,342 A * 7/1932 Yurkovitch .................. 16/353
1,910,102 A * 5/1933 Godfrey ...................... 16/381
(Continued)

FOREIGN PATENT DOCUMENTS

EP     2 451 260 A1    5/2012
EP     2451260       *    5/2012

OTHER PUBLICATIONS

Notification of Transmittal of the International Search Report and the Written Opinion of the International Searching Authority, or the Declaration; International Search Report and Written Opinion of the International Searching Authority for corresponding International Application No. PCT/US2014/050778 mailed on Dec. 3, 2014, 15 pages.

(Continued)

*Primary Examiner* — Jeffrey O Brien
(74) *Attorney, Agent, or Firm* — Kilpatrick Townsend and Stockton LLP

(57) ABSTRACT

Embodiments generally relate to hinge mechanisms. Many of the hinge mechanism embodiments may be used in foldable furniture. The foldable furniture may be a foldable seat or table. The hinge mechanism may include a central cylinder with a body defining a hinge axis. The central cylinder may have rotate channel(s) transverse to the hinge axis and locking channels extending axially from the rotate channel(s). Collar(s) may couple with the central cylinder and may include pin(s) that protrude inwardly into the rotate channel(s) and locking channel(s) of the central cylinder. In some embodiments, an intermediate cylinder may be disposed between the central cylinder and the collar(s). The intermediate cylinder may have slots corresponding to the rotate channel(s) of the central cylinder. When pin(s) and locking channel(s) are aligned, the central lock cylinder may move axially to lock the collars in a desired angular position (e.g., a deployed or folded configuration).

15 Claims, 28 Drawing Sheets

(51) Int. Cl.
 *A47C 4/04* (2006.01)
 *A47B 3/08* (2006.01)
 *B25H 1/00* (2006.01)
 *B25H 1/02* (2006.01)

(52) U.S. Cl.
 CPC .. *B25H 1/02* (2013.01); *E05D 5/16* (2013.01); *Y10T 16/544* (2015.01); *Y10T 16/5406* (2015.01); *Y10T 16/5443* (2015.01); *Y10T 16/5535* (2015.01)

(56) References Cited

U.S. PATENT DOCUMENTS

| | | | | | |
|---|---|---|---|---|---|
| 3,921,422 | A | * | 11/1975 | Walters | 70/97 |
| 4,603,452 | A | * | 8/1986 | Paciorek | 16/262 |
| 5,809,617 | A | * | 9/1998 | Harris et al. | 16/273 |
| 8,307,513 | B1 | * | 11/2012 | Fitzgerald | 16/386 |

OTHER PUBLICATIONS

Underhill, "Roubo's Folding Bookstand", Popular Woodworking Magazine, Feb. 2011, #188, 8 pages.

* cited by examiner

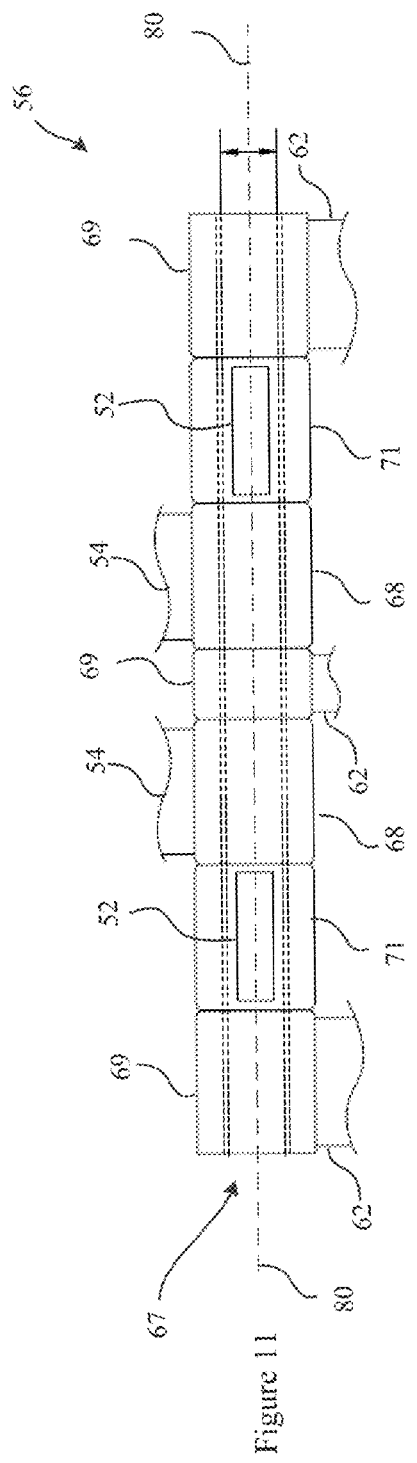
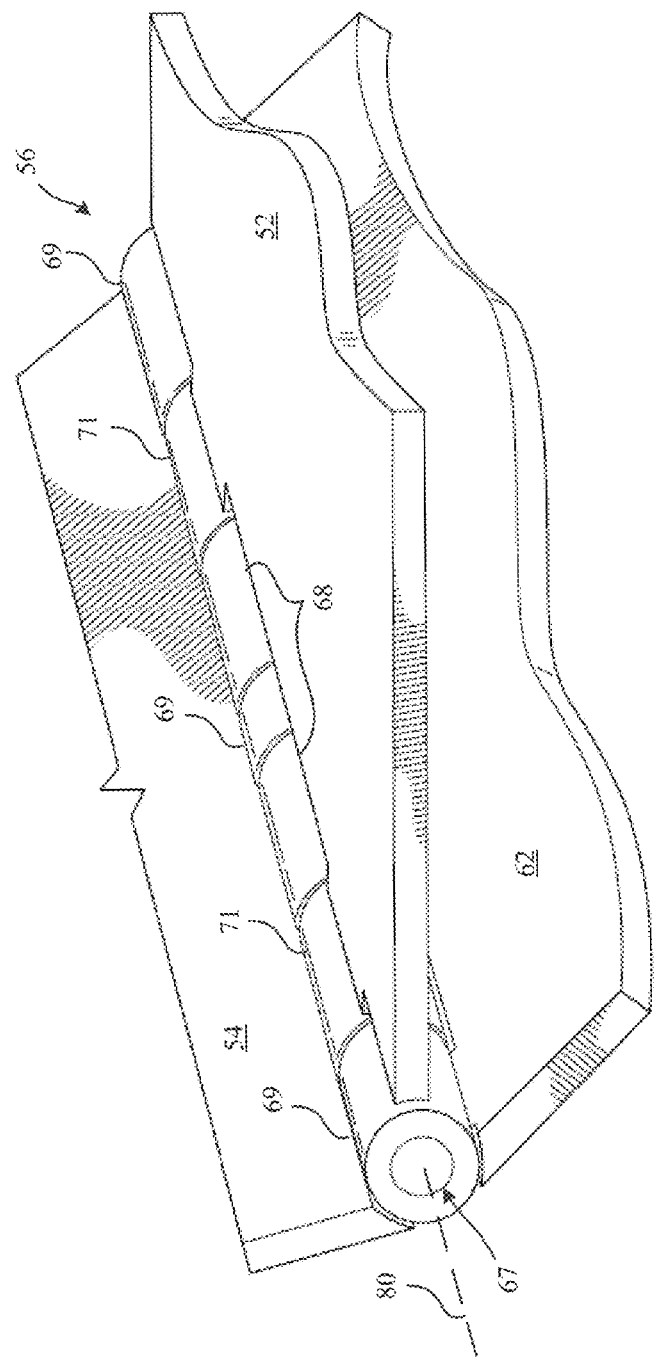
Figure 11
Figure 12

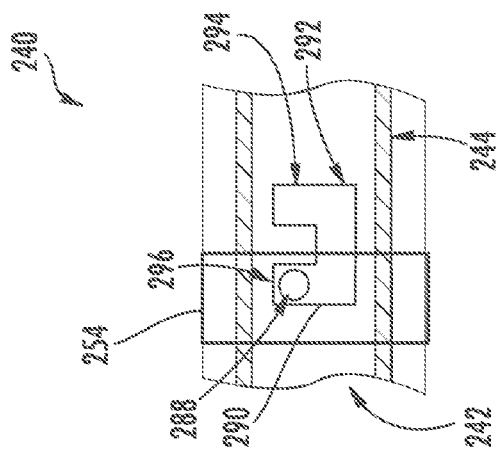
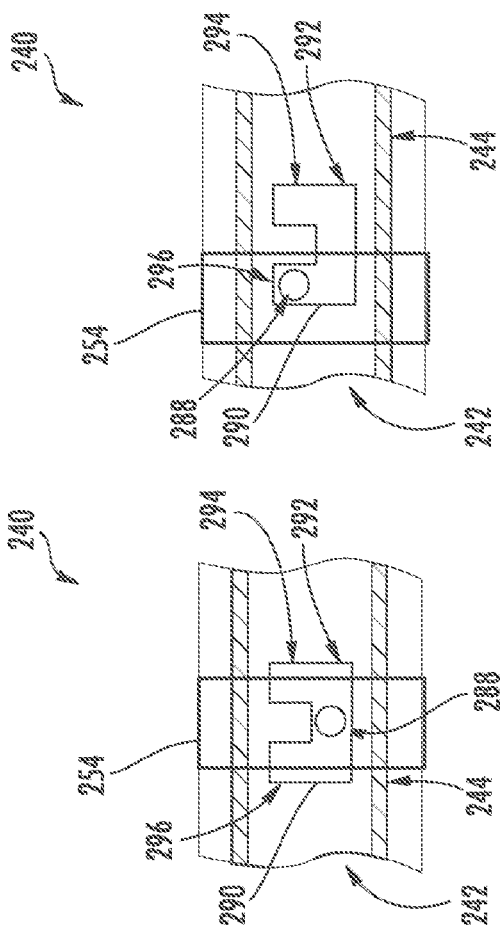
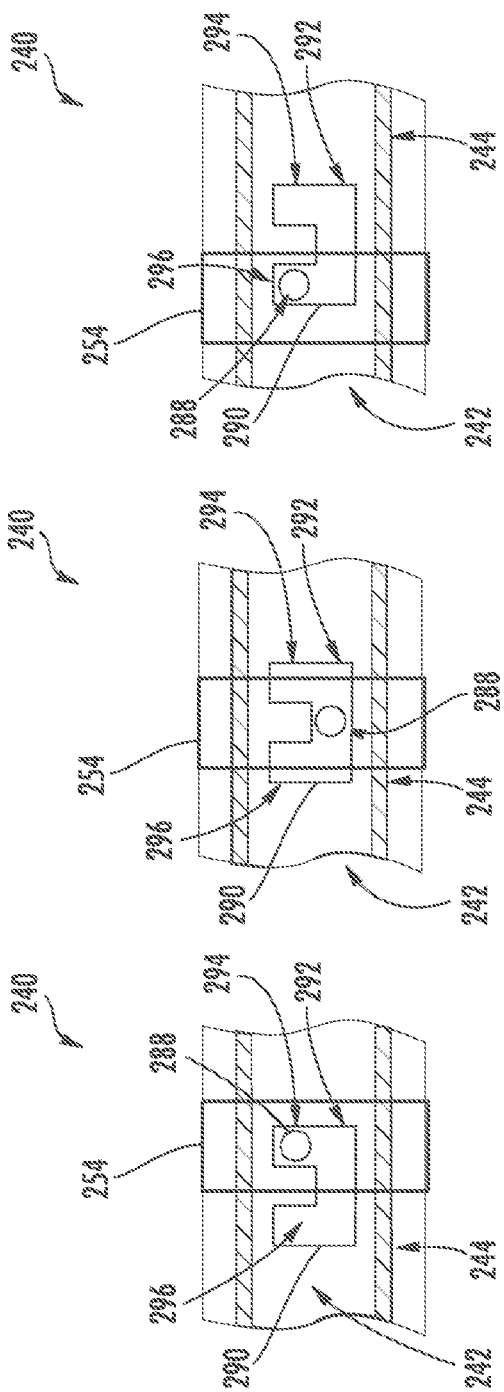
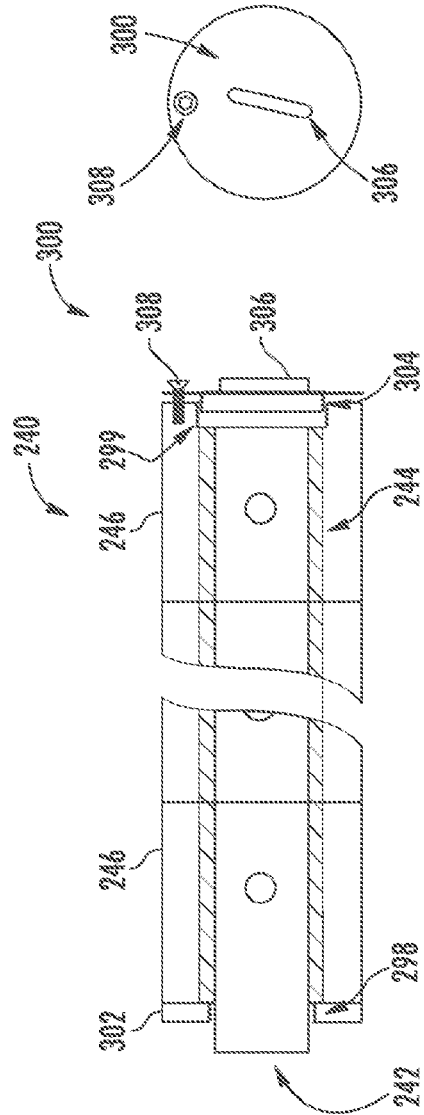

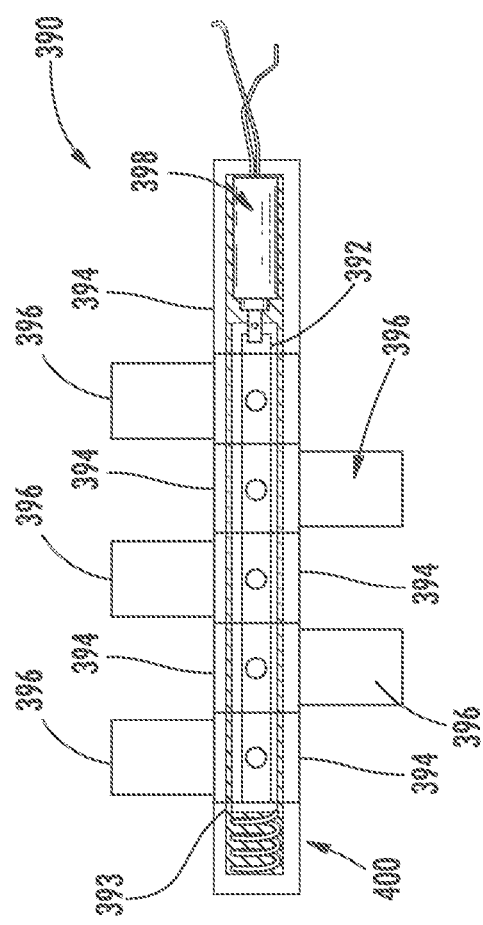
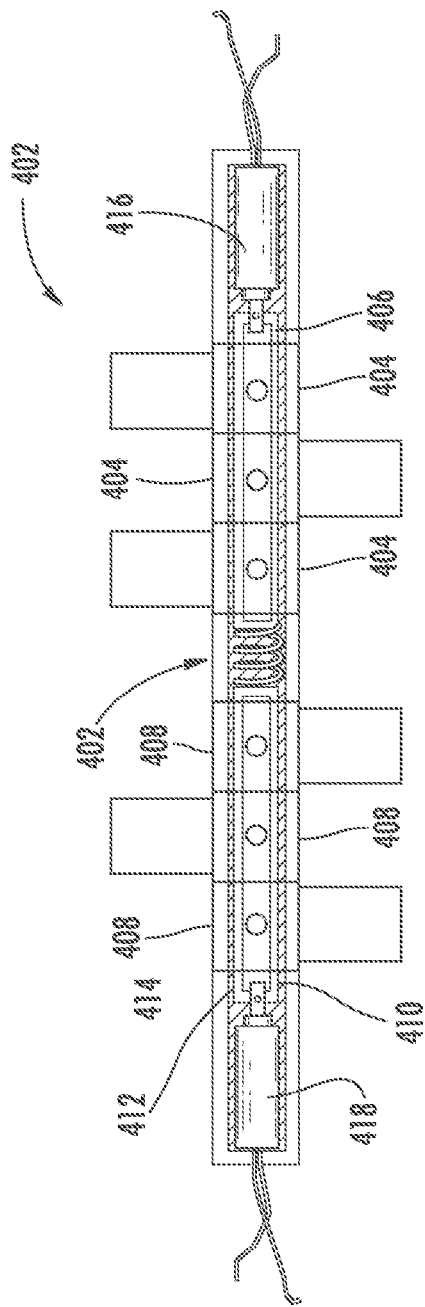

HINGE MECHANISMS AND FOLDABLE FURNITURE

CROSS REFERENCE TO RELATED APPLICATION

This application claims priority to and the benefit of U.S. Provisional Application No. 61/865,339 filed Aug. 13, 2013; U.S. Provisional Application No. 61/899,630 filed Nov. 4, 2013; and U.S. Provisional Application No. 62/007,050 filed Jun. 3, 2014, the full disclosures of which are incorporated herein by reference in their entirety for all purposes.

BACKGROUND OF THE INVENTION

Embodiments of the present invention generally relate to hinge mechanisms and their potential use in foldable furniture such as foldable chairs, tables, stools, work benches, or the like. Some embodiments may generally relate to a method of manufacturing hinge mechanisms.

While a number of hinge and furniture designs and configurations have been proposed, further improvements, designs, and modularity may be desired.

SUMMARY OF THE INVENTION

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

In some embodiments, a hinge mechanism is provided. The hinge mechanism may include a central lock cylinder (also referred to as a "locking cylinder" and in some instances as a "floating lock cylinder") having an elongate length defining a hinge axis. The central lock cylinder may include a first rotate channel transverse to the hinge axis. The first rotate channel may have a first end and a second end and an angular length therebetween. The central lock cylinder may further include a first locking channel extending from the first rotate channel in an axial direction. An intermediate hinge cylinder (also referred to as an "arc control cylinder") may be disposed about the central lock cylinder and may be rotatable relative to the central lock cylinder about the hinge axis. The intermediate hinge cylinder may include a first slot axially aligned with the first rotate channel of the central lock cylinder. In many embodiments, the first slot may have an angular length less than or equal to the angular length of the first rotate channel of the central lock cylinder. This may reduce the occurrence of the central lock cylinder binding due to weight, friction, and torque exerted on the hinge mechanism. A first collar may be disposed about the intermediate hinge cylinder. The first collar may include a first collar pin protruding inwardly from the first collar, through the first slot opening of the intermediate hinge cylinder, and into the first rotate channel of the central lock cylinder. The first collar pin of the first collar may cooperate with the first rotate channel to limit an axial range of movement between the first collar and the central lock cylinder in the axial direction. In further aspects, the first collar may have a rotational range of motion about the hinge axis relative to the central lock cylinder when the first collar pin is positioned within the first rotate channel.

When the first collar pin of the first collar is rotationally aligned with the first locking channel, the central lock cylinder may be movable in the axial direction relative to the first collar to transition the hinge mechanism into a first locking configuration where at least a portion the first collar pin of the first collar is positioned within the first locking channel. When at least a portion the first collar pin of the first collar is positioned within the first locking channel, the rotational range of motion of the first collar about the hinge axis relative to the central lock cylinder may be reduced.

Optionally, the first locking channel may extend from the first end of the first rotate channel. In some embodiments, the central lock cylinder further includes a second locking channel extending from the second end of the first rotate channel in the axial direction.

When the first collar pin of the first collar is rotationally aligned with the second locking channel, the central lock cylinder may be movable in the axial direction relative to the first collar to transition the hinge mechanism into a second locking configuration where at least a portion the first collar pin of the first collar is positioned within the second locking channel.

When at least a portion the first collar pin of the first collar is positioned within the second locking channel, the rotational range of motion of the collar about the hinge axis relative to the central lock cylinder may be reduced.

In some embodiments, the first locking channel and the second locking channel may extend from the first rotate channel in opposite directions.

In some embodiments, the first locking channel and the second locking channel extend from the first rotate channel in the same direction.

Optionally, the first locking configuration of the hinge mechanism may be a closed configuration of the hinge mechanism and the second locking configuration may be an open configuration of the hinge mechanism.

In some embodiments, the central lock cylinder may further include a second rotate channel transverse to the hinge axis—the second rotate channel including a first end and a second end and an angular length therebetween. Optionally, the angular length of the second rotate channel is different than the angular length of the first rotate channel. In some embodiments a rotational position of the second rotate channel is different than a rotational position of the first rotate channel. The central lock cylinder may further include a second locking channel extending from the second rotate channel in an axial direction. The intermediate hinge cylinder may also include a second slot axially aligned with the second rotate channel of the central lock cylinder. The second slot may be configured with an angular length less than or equal to the angular length of the second rotate channel of the central lock cylinder. A second collar may be disposed about the intermediate hinge cylinder. The second collar may include a second collar pin protruding inwardly from the second collar, through the second slot of the intermediate hinge cylinder and into the second rotate channel of the central lock cylinder.

The second collar pin of the second collar may cooperate with the rotate channel to limit an axial range of movement between the second collar and the central lock cylinder in the axial direction. The second collar may have a rotational range of motion about the hinge axis relative to the central lock cylinder that is different that the rotational range of motion of the first collar. The central lock cylinder may be movable in the axial direction relative to the first and second collars to transition the hinge mechanism into the first locking configuration—where at least a portion the first collar pin of the first collar is positioned within the first locking channel and at least a portion the second collar pin of the second collar is positioned within the second locking channel—when the first collar pin of the first collar is rotationally aligned with the first locking channel and the second collar pin of the second collar is rotationally aligned with the second locking channel. When at least a portion the first collar pin of the first collar is positioned within the first locking channel and when at least a portion the second collar pin of the second collar is positioned within the second locking channel, a rotational range of motion of the first collar relative to the second collar about the hinge axis may be reduced.

In some embodiments an edge formed between the first rotate channel and the first locking channel may be rounded.

Optionally, the intermediate hinge cylinder may further house a spring that biases the central lock cylinder in the axial direction toward the hinge mechanism locking configuration.

In some embodiments, the central lock cylinder may further include an axial channel extending in the axial direction and an axial lock channel extending from the axial channel in a direction transverse to the hinge axis. The hinge mechanism may further include a locking collar. The locking collar may include a locking collar pin protruding inwardly through the intermediate hinge cylinder and into the axial channel. The central lock cylinder may have an axial range of motion relative to the first collar when the locking collar is rotated such that the locking collar pin is positioned within the axial channel. The axial range of motion between the central lock cylinder and the first collar may be reduced when the locking collar is rotated such that the locking collar pin is positioned within the axial lock channel.

Optionally, a hinge endplate may be provided that is attachable to an end of the hinge mechanism to reduce an axial range of motion between the central lock cylinder and the first collar.

In some embodiments, a furniture unit is provided that includes a hinge mechanism described herein. The furniture unit may be a seat deployable between a folded position and a deployed position. Optionally, the furniture unit may be a table deployable between a folded position and a deployed position.

In further aspects of the invention, a furniture unit configured to be deployable between a folded position and a deployed position may be provided. The furniture unit may include a first furniture piece and a second furniture piece coupled to the first furniture piece by a hinge mechanism. The second furniture piece may be rotatable relative to the first furniture piece. The hinge mechanism may include a central lock cylinder having a surface and an elongate length defining a hinge axis. The central lock cylinder may further include a first rotate channel along the surface and transverse to the hinge axis.

A first collar may be provided and coupled with the central lock cylinder along a first portion of the elongate length of the central lock cylinder. The first collar may include a first collar pin protruding inwardly from the first collar and into the first rotate channel of the central lock cylinder. The first collar pin of the first collar may cooperate with the first rotate channel to limit an axial range of movement between the first collar and the central lock cylinder in an axial direction. The first collar may have a rotational range of motion about the hinge axis relative to the central lock cylinder. The first furniture piece may be coupled with the first collar.

In some embodiments, the first rotate channel of the central lock cylinder may have an annular segment configuration. The first collar pin may cooperate with the first rotate channel to limit the rotational range of motion of the first collar about the hinge axis relative to the central lock cylinder to less than 360 degrees (e.g., less than 135 degrees).

The central lock cylinder of the hinge mechanism may further include a first locking channel extending from the first rotate channel in the axial direction. When the first collar pin of the first collar is rotationally aligned with the first locking channel, the central lock cylinder may be movable in the axial direction relative to the first collar to lock the furniture unit into the deployed position or the folded position where at least a portion the first collar pin of the first collar is positioned within the first locking channel. When at least a portion the first collar pin of the first collar is positioned within the first locking channel, the rotational range of motion of the first collar about the hinge axis relative to the central lock cylinder may be reduced.

An edge formed between the first rotate channel and the first locking channel may be rounded to facilitate movement of the first collar pin into and out of the first locking channel.

The central lock cylinder may be nested within an intermediate hinge cylinder positioned between the central lock cylinder and the first collar. The intermediate hinge cylinder may be rotatable about the hinge axis relative to the central lock cylinder and the first collar. The intermediate hinge cylinder may include a first slot corresponding to the first rotate channel of the central lock cylinder such that the first collar pin of the first collar protrudes through the first slot of the intermediate hinge cylinder and into the first rotate channel of the central lock cylinder. Optionally, an angular length of the first slot may be less than an angular length of the first rotate channel.

In some embodiments, the first furniture piece may be rotatable about the hinge axis to a position adjacent and parallel to the second furniture piece. A thickness of the first furniture piece in addition to a thickness of the second furniture piece may be equal to the diameter of the first collar.

In some embodiments, the second furniture piece may be integrally formed with the central lock cylinder.

In some embodiments, the hinge mechanism may further include a second rotate channel along the surface and transverse to the hinge axis, a third rotate channel along the surface and transverse to the hinge axis, and/or a fourth rotate channel along the surface and transverse to the hinge axis. The hinge mechanism may further include a second collar rotatably coupled with the central lock cylinder along a second portion of the elongate length of the central lock cylinder—the second collar coupled to the second furniture piece and having a second collar pin protruding inwardly into the second rotate channel. The hinge mechanism may further a third collar rotatably coupled with the central lock cylinder along a third portion of the elongate length of the central lock cylinder—the third collar coupled to a third furniture piece and having a third collar pin protruding inwardly into the third rotate channel. The hinge mechanism may further include a fourth collar rotatably coupled with the central lock cylinder along a fourth portion of the elongate length of the central lock cylinder—the fourth collar coupled to a fourth furniture piece and having a fourth collar pin protruding inwardly into the fourth rotate channel.

The hinge mechanism may further include a first locking channel extending from the first rotate channel in the axial direction, a second locking channel extending from the second rotate channel in the axial direction, a third locking channel extending from the third rotate channel in the axial direction, and/or a fourth locking channel extending from the fourth rotate channel in the axial direction.

The first furniture piece, the second furniture piece, the third furniture piece, and the fourth furniture piece may be deployable from the folded configuration to the deployed configuration. The first furniture piece, second furniture piece, third furniture piece, and fourth furniture piece may be in the deployed configuration when the first collar pin, the second collar pin, the third collar pin, and the fourth collar pin are rotatably aligned with and/or positioned in the first locking channel, the second locking channel, the third locking channel, and the fourth locking channel, respectively.

In some embodiments, the first collar and the first collar pin of the hinge mechanism may be an integral piece.

In some embodiments, the first collar and the first collar pin of the hinge mechanism may be separate pieces. The first collar may include a collar pin hole for receiving the first collar pin therethrough.

In further aspects of the present invention, yet another hinge mechanism is provided. The hinge mechanism may include a central lock cylinder having an elongate length defining a hinge axis. The central lock cylinder may further include a first rotate channel transverse to the hinge axis at a first portion of the central lock cylinder and a locking channel extending from the rotate channel in the an axial direction.

The hinge mechanism may further include three separate flats rotatably coupled with the central lock cylinder. In some embodiments, at least two of the three flats may be coupled with the central lock cylinder via a first collar and a second collar, respectively. The first collar may be coupled with the central lock cylinder along the first portion of the elongate length of the central lock cylinder. The first collar may include a first collar pin protruding inwardly from the first collar and into the first rotate channel of the central lock cylinder.

The first collar pin of the first collar may cooperate with the first rotate channel to limit movement between the first collar and the central lock cylinder in the axial direction. The first collar may have a rotational range of motion about the hinge axis relative to the central lock cylinder.

In some embodiments, at least one of the three flats may be integrally formed with the central lock cylinder.

Optionally, in some embodiments the central lock cylinder may further include a second rotate channel transverse to the hinge axis at a second portion of the elongate length of the cylinder hinge, a third rotate channel transverse to the hinge axis at a third portion of the elongate length of the central lock cylinder, and/or a fourth rotate channel transverse to the hinge axis at a fourth portion of the elongate length of the cylinder hinge.

The central lock cylinder may further include a second locking channel extending from the second rotate channel in the axial direction, a third locking channel extending from the third rotate channel in the axial direction, and/or a fourth locking channel extending from the fourth rotate channel in the axial direction. The at least three separate flats may comprise a first flat, a second flat, a third flat, and a fourth flat. The first flat may couple with the first collar. The second flat may couple along the second portion of the central lock cylinder via the second collar. The second collar may include a second collar pin protruding inwardly from the second collar and into the second rotate channel of the central lock cylinder.

The third flat may couple along the third portion of the central lock cylinder via a third collar. The third collar may include a third collar pin protruding inwardly from the third collar and into the third rotate channel of the central lock cylinder.

The fourth flat may couple along the fourth portion of the central lock cylinder via a fourth collar. The fourth collar may include a fourth collar pin protruding inwardly from the fourth collar and into the fourth rotate channel of the central lock cylinder.

The hinge mechanism may have a deployed configuration. The hinge may be in the deployed configuration when the first collar pin, the second collar pin, the third collar pin, and the fourth collar pin are rotatably aligned with and/or positioned in the first locking channel, the second locking channel, the third locking channel, and the fourth locking channel, respectively.

While some embodiments have collars with studs protruding inwardly into rotate and/or lock channels of the central lock cylinder, other embodiments of the hinge may have collars with rotate and/or lock channels that are configured to receive a stud extending outwardly from the surface of the central lock cylinder. Further, it should be understood that in some embodiments, some collars of a hinge may include rotate and/or locking channels for receiving a stud extending outwardly from the surface of the central lock cylinder, while other collars of the hinge include studs that project inwardly into rotate and/or locking channels of the central lock cylinder. Accordingly, in some embodiments, features of the collar and central lock cylinder may be reversible and may be configured to provide similar utility.

Thus, in some aspects of the present invention, a hinge mechanism is provided that includes a central cylinder having an elongate length defining a hinge axis and a collar disposed about the central cylinder. The collar may include a rotate channel transverse to the hinge axis. The rotate channel may include a first end and a second end and an angular length therebetween. The collar may also include a locking channel extending from the rotate channel in an axial direction. The central cylinder may include a stud protruding outwardly from a surface of the central cylinder into the rotate channel or the lock channel of the collar. The stud of the central cylinder may cooperate with the rotate channel to limit an axial range of movement between the collar and the central cylinder in the axial direction. The collar may have a rotational range of motion about the hinge axis relative to the central cylinder when the stud is positioned within the rotate channel of the collar. When the stud of the central cylinder is rotationally aligned with the locking channel, the central cylinder is movable in the axial direction relative to the collar to transition the hinge mechanism into a locking configuration where at least a portion the stud of the central cylinder is positioned within the locking channel of the collar. When at least a portion the stud of the central cylinder is positioned within the locking channel, the rotational range of motion of the collar about the hinge axis relative to the central cylinder may be reduced.

The hinge mechanism may also include an intermediate cylinder positioned between the collar and the central cylinder and rotatable relative to the central cylinder about the hinge axis. The intermediate cylinder may include a slot axially aligned with the rotate channel of the collar. The slot may have an angular length less than or equal to the angular length of the rotate channel of the collar. The stud of the central cylinder may protrude outwardly through the first slot opening of the intermediate cylinder and into the rotate channel of the collar. Further, embodiments of the hinge mechanism may also include many of the features described above and throughout this application.

The invention will be better understood on reading the following description and examining the figures that accompany it. These figures are provided by way of illustration only and are in no way limiting on the invention.

BRIEF DESCRIPTION OF THE DRAWINGS

FIG. 11 illustrates a top view of an exemplary hinge;

FIG. 12 illustrates further details of the exemplary hinge of FIG. 11;

FIG. 39 illustrates a lock position of an exemplary lock collar of the exemplary hinge of FIG. 33;

FIG. 40 illustrates the exemplary lock collar of FIG. 39 in an unlocked position according to some embodiments;

FIG. 41 illustrate another lock position of the exemplary lock collar of FIG. 39 according to some embodiments;

FIG. 42 shows another exemplary method and system for locking a central lock cylinder of hinge in an axial direction according to some embodiments;

FIG. 43 shows another view of the locking plate of FIG. 42;

FIG. 52 shows an exemplary which may use a solenoid to control the locking and unlocking of the hinge and an optional internal spring for biasing the central lock cylinder in the axial direction; and FIG. 53 illustrates an exemplary hinge with two central lock cylinders controlled with two separate solenoids and an optional internal spring for biasing the central lock cylinder in the axial direction.

DETAILED DESCRIPTION OF THE DRAWINGS

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Figure 1:
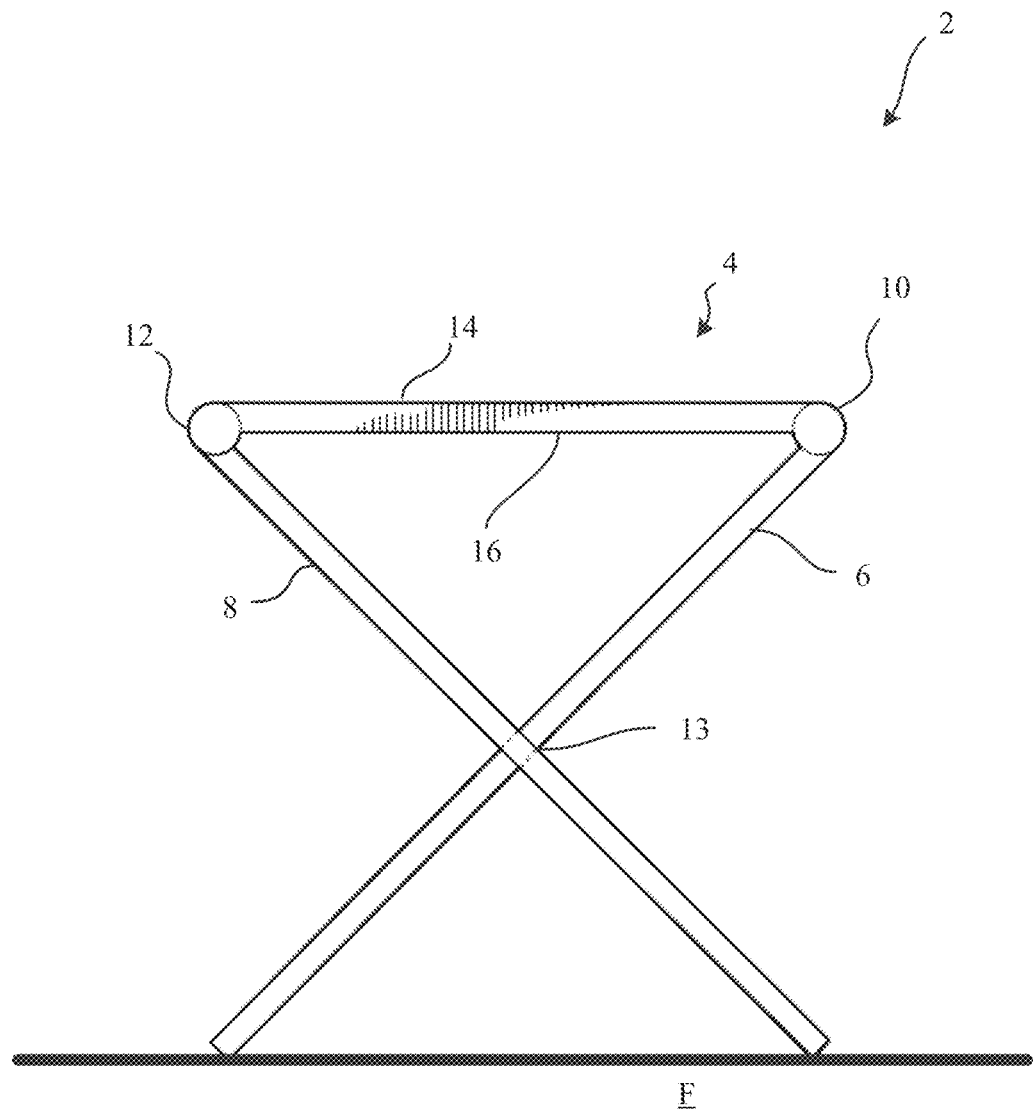
FIG. 1 shows an exemplary furniture unit in a first configuration according to some embodiments.

FIG. 1 shows an exemplary modular furniture unit 2 in a first configuration according to some embodiments. The furniture unit 2 comprises a furniture piece 4, a first leg 6, and a second leg 8. The first leg 6 couples to the furniture piece 4 at a first side of the furniture piece 4 via first hinge 10. The second leg couples to the furniture piece 4 at a second side of the furniture piece 4 opposite the first side via a second hinge 12. In many embodiments, the first leg 6 and the second leg 8 intersect and create a joint 13 of furniture unit 2 that limits the rotation of first leg 6 and second leg 8 about hinges 10, 12, respectively. When the joint 13 is formed between first leg 6 and second leg 8, the furniture unit 2 may then provide a fixed surface for supporting weight (e.g., for sitting, kneeling, working, or the like). Optionally, legs 6, 8 may be disengaged and rotated away from one another to a folded/flat configuration where one or both legs are rotated to a position against adjacent furniture piece 4 (e.g., parallel to a plane of furniture piece 4 and/or coplanar with furniture piece 4). Advantageously, in the folded/flat configuration of furniture unit 2 may allow for easy storage (e.g., hanging on a wall) and/or stacking of multiple furniture units 2 on top of one another.

The modular furniture unit 2 may be a stool, workstation, chair, table, or the like according to some embodiments. The furniture piece 4 may be a generally flat piece with a first major surface 14 and a second major surface 16 opposite the first major surface 14. The first major surface 14 and/or the second major surface 16 may have a generally flat configuration. In some embodiments, the first and/or second major surface 14, 16 of furniture piece 4 may be a table or workstation top. In other embodiments, the first and/or second major surface 14, 16 of the furniture piece 4 may be a seat or stool bottom.

The first leg 6 and the second leg 8 may rotate relative to the first furniture piece 4 about hinge 10 and hinge 12, respectively, and cooperate with one another to position the modular furniture unit 2 in various configurations (e.g., folded/flat configuration, etc.). For example, in the first configuration illustrated in FIG. 1, a joint 13 is formed between the first leg 6 and the second leg 8 so that the first major surface 14 of the furniture unit may be substantially horizontal with the floor F. In embodiments where first leg 6 and second leg 8 are similar lengths, this may be accomplished by forming joint 13 along a vertical midline between hinge 10 and hinge 12.

Figure 2:
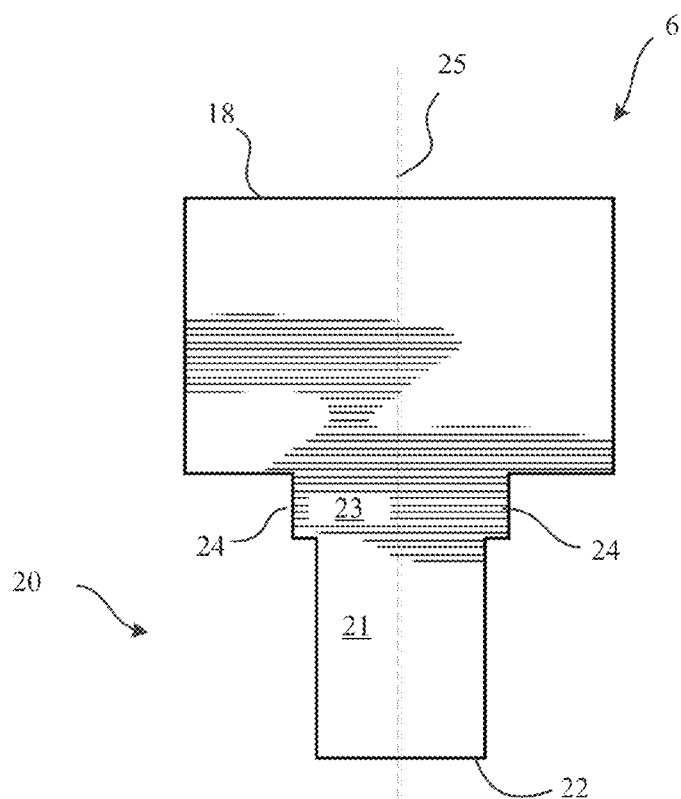
FIG. 2 shows an exemplary front leg of the exemplary furniture unit of FIG. 1 according to some embodiments.

FIG. 2 illustrates an exemplary configuration for first leg 6 according to some embodiments of the present invention. First leg 6 includes one or more engagement features that cooperate with engagement features on second leg 8. In the illustrated embodiment, first leg 6 has a top side 18 that couples with the furniture piece 4 via hinge 10. In some embodiments, the top side 18 of first leg 6 may be fixed/integral with the hinge 10. From the top side 18, a width of first leg 6 may narrow at a tongue 20. The tongue 20 may further include one or more intermediate step portions 24 where the tongue 20 further reduces in width in a step-wise manner to the bottom side 22 of first leg 6. The one or more intermediate step portions 24 may define separate tongue portions having different widths. For example, in the illustrated embodiment, tongue 20 may include a first portion 21 having a first portion width and a second portion 23 with a second portion width that is greater than the first portion width. Optionally, tongue 20 and step portion 24 may be centered along a vertical midline 25 of first leg 6.

Figure 3:
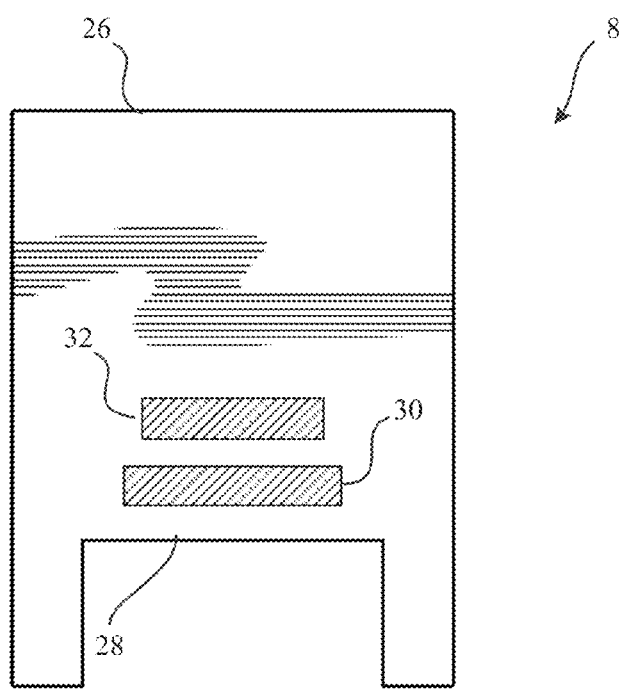
FIG. 3 shows an exemplary back leg of the exemplary furniture unit of FIG. 1 according to some embodiments.

FIG. 3 illustrates an exemplary complementary configuration for second leg 8 according to some embodiments of the invention. As mentioned above, in many embodiments, second leg 8 may include one or more engagement features that cooperate with engagement features on first leg 6 to form joint 13. In the illustrated embodiment, second leg 8 has a top side 26 that couples with the furniture piece 4 via hinge 12. In some embodiments, the top side 26 of second leg 8 may be fixed/integral with the hinge 12. Opposite the top side 26, second leg 8 may include a recessed side 28. Further, second leg 8 may include a first slot 30 and a second slot 32.

Recessed side 28 may have a width configured to receive and engage with at least the first portion 21 of tongue 20 to form joint 13. Optionally, the recessed side 28 may also have a width sufficient to receive and engage with second portion 23 of tongue 20 to form joint 13. Optionally, the first slot 30 may have a configuration for receiving and engaging with the second portion 23 of tongue 20. Accordingly, the first slot 30 may have a width greater than or equal to a width of portion 23 and a height greater than or equal to a thickness of first leg 6. Further, second slot 32 may have a configuration that corresponds to portion 21 of tongue 20. For example, second slot 32 may have a width greater than or equal to a width of portion 21 but less than a width of portion 23 and a height greater than or equal to a thickness of first leg 6.

Figure 4:
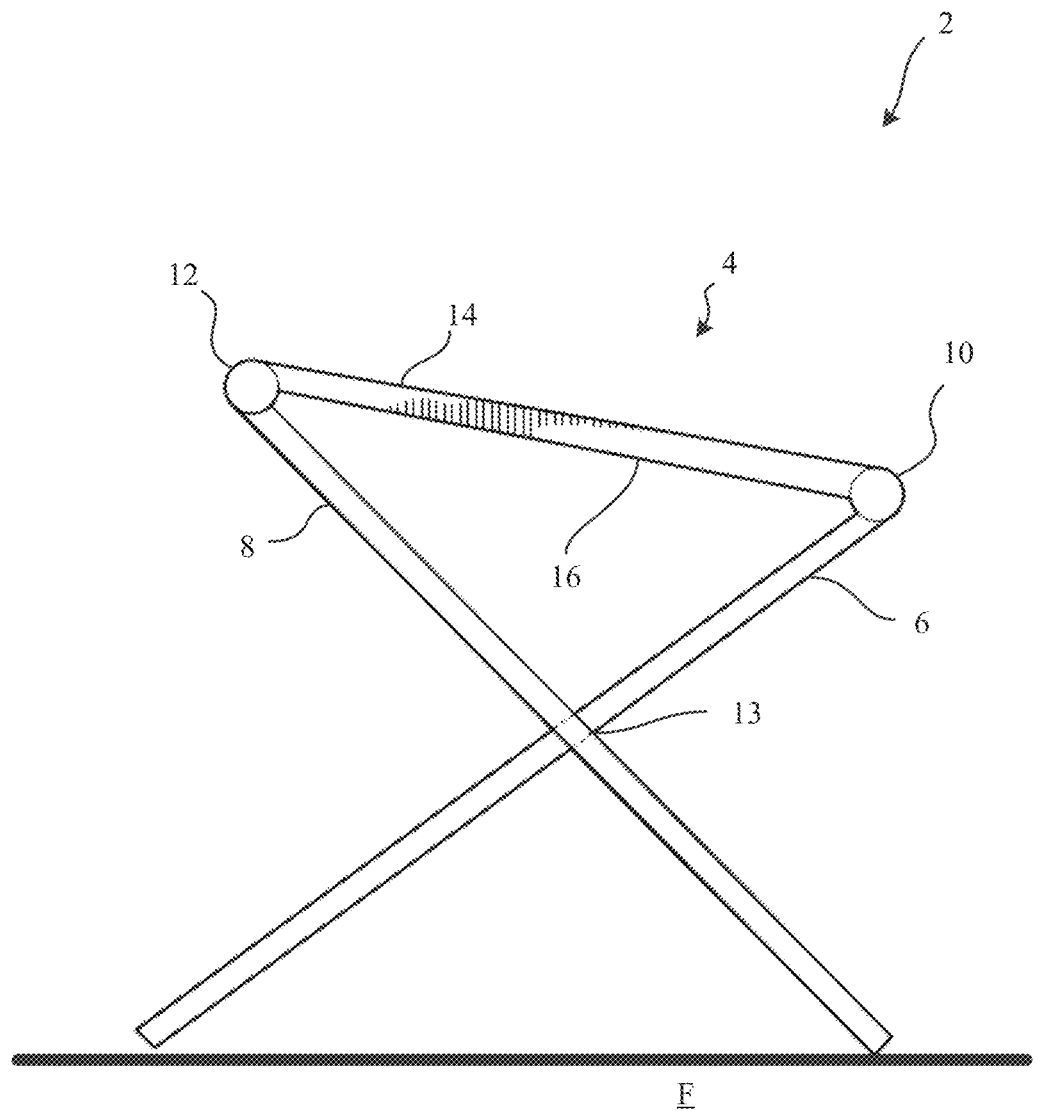
FIG. 4 shows the exemplary furniture unit of FIG. 1 in a second configuration according to some embodiments.

As can be appreciated, the first leg 6 may engage second leg 8 in a number of ways. For example, the tongue 20 and step portion 24 of first leg 6 may be rotated within recessed side 28 to form joint 13 between the first leg 6 and the second leg 8. Alternatively, the tongue 20 and step portion 24 may be rotated and slid within slot 30 to form joint 13 between first leg 6 and the second leg 8. It yet another alternative, the tongue 20 may be rotated and slide within slot 32 to form joint 13 between first leg 6 and second leg 8. The multitude of engagement options provides for a modular furniture unit 2 where the height and/or angle of the first furniture piece 4 may be varied. For example, FIG. 4 shows the exemplary stool, workstation, chair, or table of FIG. 1 in a second configuration where joint 13 is formed in an alternative location. In the second configuration, the first major surface 14 may be slanted relative to floor F.

In further embodiments, the first leg 6 and the second leg 8 may be rotated to the other side of furniture piece 4 and engaged with one another such that the furniture user may utilize second major surface 16 and may use second major surface 16 at various heights and/or angles. Accordingly, depending on the configuration of the ladder slots and the step tongue, the height and/or the angle of the first furniture piece 4 may be varied.

Additionally, furniture unit 2 may be flattened for easy storage or carrying. For example, First leg 6 and second leg 8 may be disengaged by rotating and sliding the legs 6, 8 away from each other. Thereafter, the legs 6, 8 may be positioned along the same plane as furniture piece 4 for easy storage of furniture unit 2. In some embodiments, one leg 6, 8 may be rotated adjacent the first major surface 14 or the second major surface 16 of furniture piece 4 while the other leg 6, 8 is positioned along the same plane as furniture piece 4. Alternatively, the other leg 6, 8, may be rotated adjacent the first major surface or the second major surface 16 of furniture piece 4 to provide a compact folded configuration.

While first leg 6 and second leg 8 are generally illustrated as symmetrical about their respective vertical midlines, it should be understood that many alternative embodiments are possible. For example, while first leg 6 is illustrated with a single tongue 20, other embodiments may utilize two, three, four, or more tongues 20. Additionally, tongue 20 may include additional step portions that correspond to additional slots in a corresponding second leg 8. Similarly, second leg 8 may be configured without a recessed side 28. For example, alternative embodiments may only include slot engagement features. Further, while illustrated with two slots 30, 32, it should be understood that embodiments may have one, three, four, five or more slots. Accordingly, the illustrated embodiment is provided by way of example only and is non-limiting.

Figure 5:
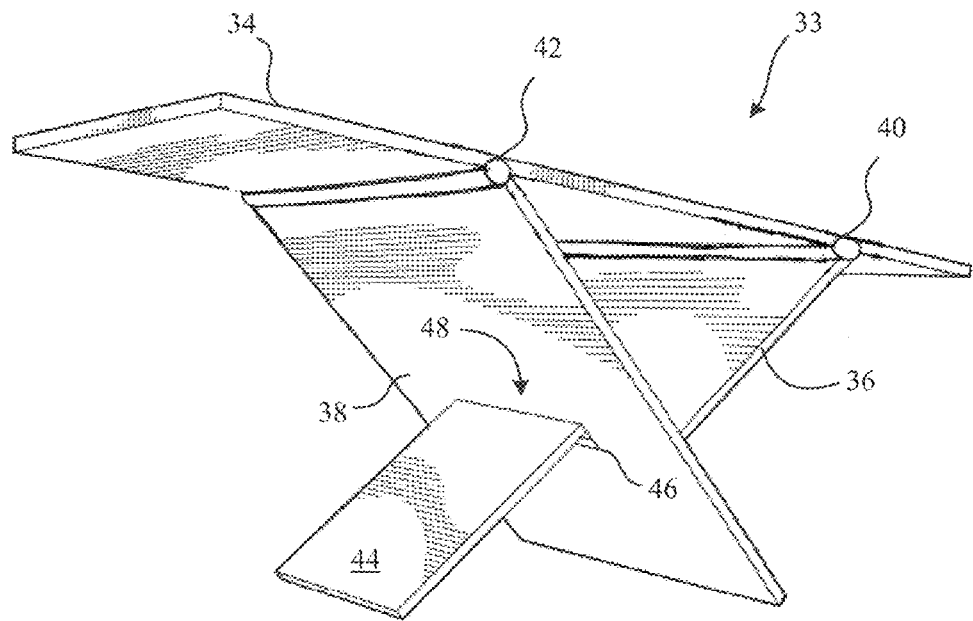
FIG. 5 shows a view of an exemplary furniture unit according to some embodiments.
Figure 6:
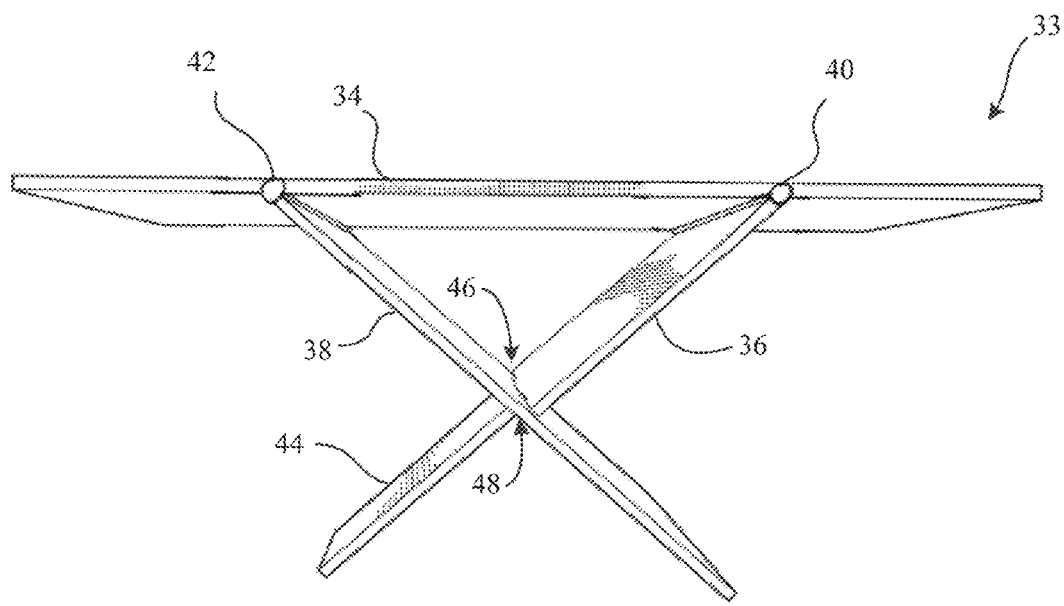
FIG. 6 shows a side view of the exemplary furniture unit of FIG. 5.

FIG. 5 and FIG. 6 shows views of another exemplary furniture unit 33. Furniture unit 33 may be table, workstation, or the like according to some embodiment. Furniture unit 33 may have a top furniture piece 34 coupled with a first leg 36 and a second leg 38. First leg 36 may couple with top furniture piece 34 via hinge 40 and second leg 38 may couple with top furniture piece 34 via hinge 42.

First leg 36 includes a tongue 44 that may be rotated within and engaged with slot 46 of second leg 38 to form a joint 48. When joint 48 is formed, furniture unit 33 may provide a stable and steady surface for supporting weight.

When the furniture unit 33 is not in use, a user may reconfigure unit 33 to a folded or flat configuration where the first leg 36 and the second leg 38 are folded flat against top furniture piece 34. This may provide easy storage and/or stacking of multiple furniture units 33. Similar to the furniture unit 2 described above, the legs 36, 38 may be configured to provide several alternative engaged positions to vary the height and/or angle of the tope furniture piece 34.

Figure 7:
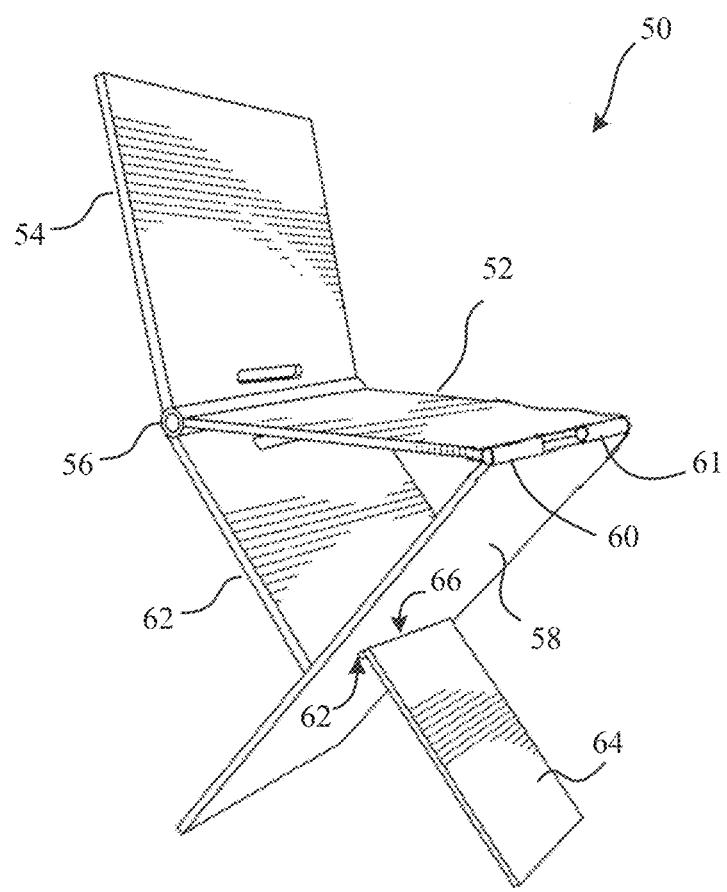
FIG. 7 illustrates an exemplary folding chair according to some embodiments.

FIG. 7 illustrates an exemplary folding chair 50 according to some embodiments. Chair 50 may be reconfigurable between a deployed configuration and a folded configuration. Chair 50 may include a seat base 52 coupled with a seat back 54 by hinge 56. The chair 50 may further include a first leg 58 (e.g., front leg) coupled with the seat base 52 by hinges 60, 61. Further, a second leg 62 (e.g., back leg) may couple with the seat base 52 and the seat back 54 by hinge 56.

First leg 58 may include a slot 62 that is configured to receive and engage a tongue 64 of second leg 52 to form a joint 66. The chair 50 may be in the deployed position when joint 66 is formed, and may thereby provide a stable and sturdy seat base 52 for use by a user. While illustrated with a single slot that corresponds with a tongue portion, other embodiments may include a plurality of slots and/or a recessed surface similar to embodiments described above to provide a variety of deployed configurations. Additionally, the tongue may include one or more portions defined by step changes in width so that the portions may preferentially engage with one or more slots and/or a recessed surface on the corresponding leg.

Figure 8:
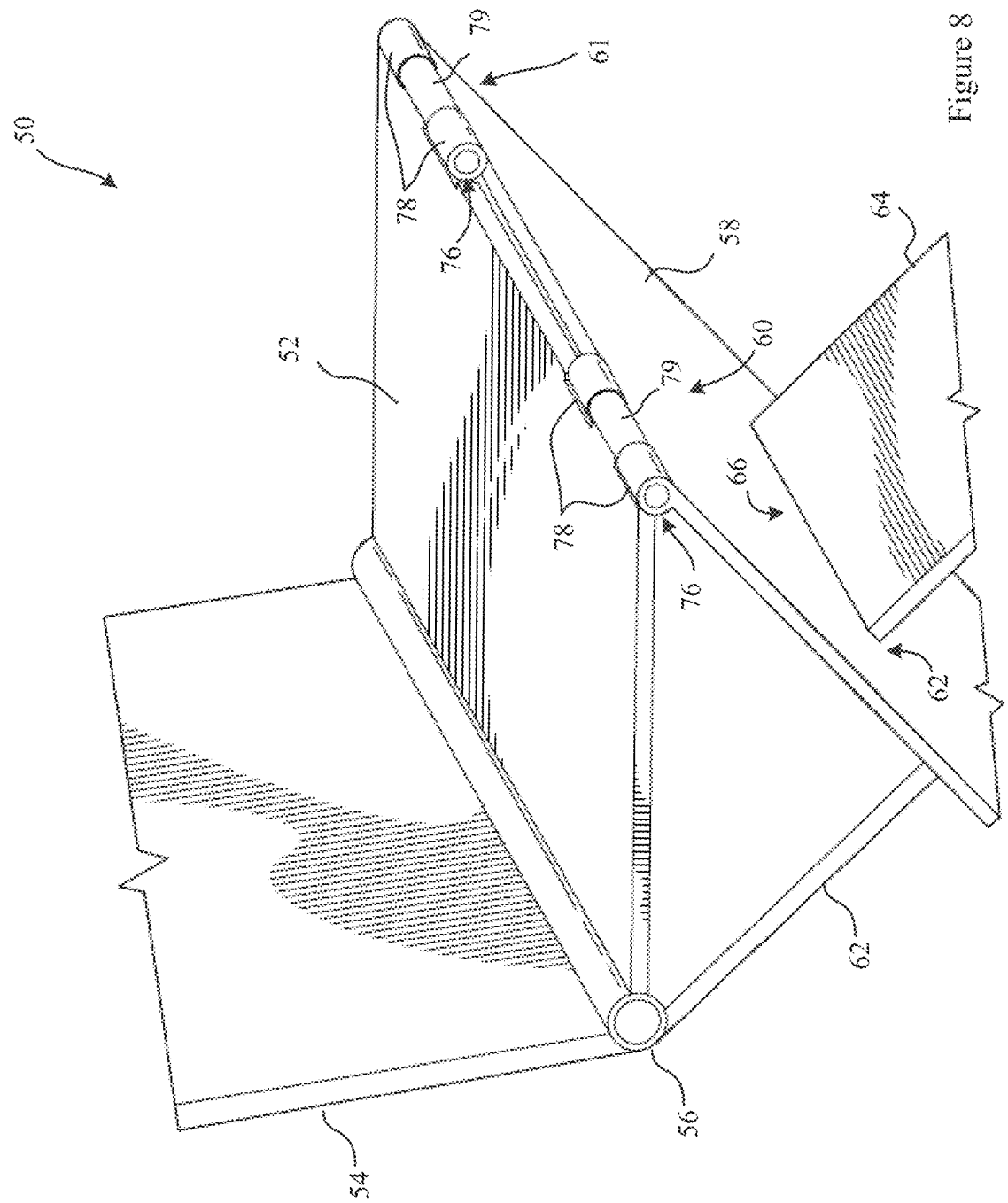
FIG. 8 illustrates a close up view of an exemplary chair hinge when the chair is in the deployed configuration.

FIG. 8 illustrates a close up view of exemplary chair hinges 56, 60, 61 when the chair 50 is in the deployed configuration. Hinge 56 couples the seat base 52, the seat back 54, second leg 62. Hinge 60, 61 couple the seat base 52 and the first leg 58. The hinge 56 allows the seat back 54 to fold down onto seat base 52 when not in use. The hinge 56 also allows the second leg 62 to fold against the bottom surface of seat 52 when chair 50 is not in use. First leg 58 may also rotate about hinges 60, 61 to a folded/closed position parallel and/or in line with seat base 52. The break between hinge 60 and hinge 61 allows the second leg 62 to fold flat against the seat base 52 and first leg 58 when in a folded configuration. For example, the break between hinges 60, 61 may be a width that accommodates a width of the tongue 64 of second leg 62.

Figure 9:
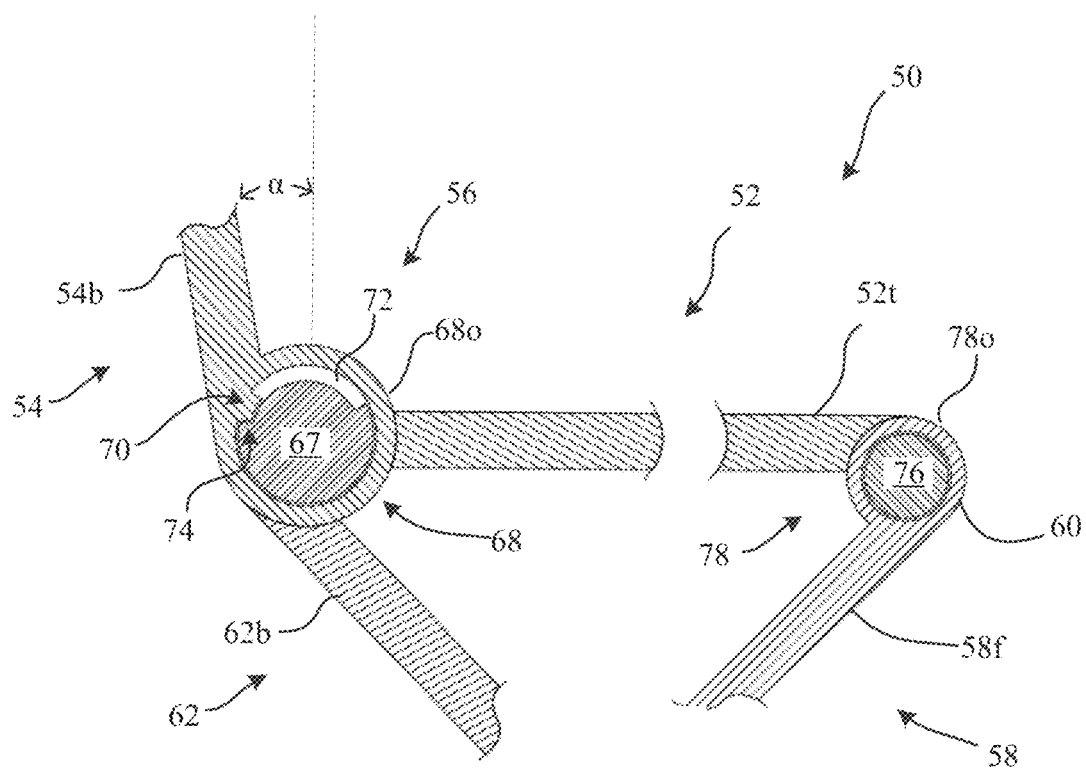
FIG. 9 illustrates a cross-sectional view of the chair when the chair is in the deployed configuration.

FIG. 9 illustrates a cross-sectional view of the chair 50 when the chair 50 is in the deployed configuration. As can be seen in FIG. 9, seat back 54 may couple to a central lock cylinder 67 via collar 68. In some embodiments, a back surface 54b of seat back 54 may be tangential to an outer surface 68o of collar 68 to provide seamless transition between the back surface 54b of seat back 54 and the collar 68. Collar 68 may further include a protrusion 70 (e.g., "stud" or "pin" used interchangeable throughout and should be interpreted with the same scope) that protrudes inwardly from the collar 68 and into a recessed channel 72 of the central lock cylinder 67. The engagement of the protrusion 70 with an end 74 of the channel 72 may allow the seat back 54 to be supported at a desired recline angle α when the chair 50 is in the deployed position. Further, the second leg 62 may also couple to central lock cylinder 67 via a collar 69 (see FIG. 11). The back surface of 62b of second leg 62 may be tangential to an outer surface of the collar 69 to provide a seamless transition between the back surface 62b of second leg 62 and the outer surface of the collar 69. Additional details of hinge 56 are discussed further below.

Hinge 60 and 61 may have similar configurations where the seat base 52 and/or the first leg 58 couple to a central lock cylinder 76 via one or more hinge collars 78, 79. First leg 58 may include a front surface 58f that may be tangential to an outer surface 78o of collar 78 to provide a seamless transition between the front surface 58f of leg 58 and the collar 78. Further a top surface 52t of seat base 52 may be tangential to an outer surface of a collar 79 (FIG. 8) that couples the seat base 52 to the central lock cylinder 76 to provide a seamless transition between the top surface 52t of seat base 52 and the collar.

Further, in some embodiments, seat back 54 and seat base 52 may have similar dimensions (e.g., length, width) such that seat back 54 may be folded down on seat base 52 about hinge 56 when the chair 50 is in the deployed configuration. In this configuration, the chair 50 may be in a stool configuration where a user may sit on the back surface 54b of seat back 54.

Figure 10:
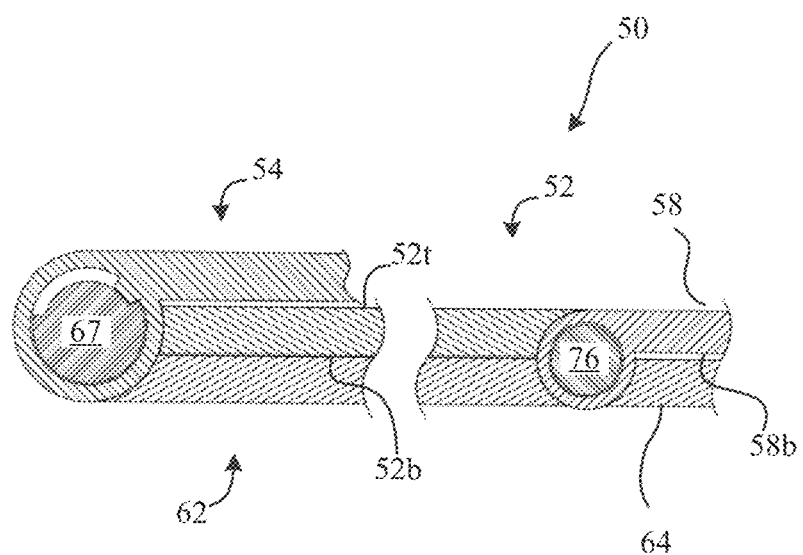
FIG. 10 illustrates a cross-sectional view of a chair when the legs and seat back are repositioned to an exemplary folded configuration.

When not in use, the first leg 58 may be disengaged with the second leg 60 and the legs 58, 62 and seat back 54 may be repositioned in line, parallel, and/or adjacent to the seat base 52 to reconfigure the seat 50 to a folded configuration. FIG. 10 illustrates a cross-sectional view of the chair 50 when the legs 58, 62 and seat back 54 are repositioned to an exemplary folded configuration. Seat back 54 may be rotated forward and positioned along a top surface 52t of seat base 52. First leg 58 may be folded forward such that the first leg 58 is parallel and/or coplanar or otherwise in line with seat base 52. The second leg 62 may rotated forward and positioned along a bottom surface 52b of seat base 52. Further a portion of second leg 62 (e.g., a tongue portion 64) may be positioned between hinges 60, 61 and along a back surface 58b of first leg 58. In some embodiments, hinge 56 may have a diameter substantially equal to a combined thickness of the seat base 52, the seat back 54, second leg 62. In some embodiments, hinge 60, 61 may have a diameter substantially equal to a combined thickness of first leg 58 and second leg 62. In some embodiments, hinge 60, 61 is smaller in diameter to hinge 56. In some embodiments, hinge 60, 61 protrude below the level of the seat base 52 a distance equal with the hinge 56, thus maintaining the folding symmetry of the first and second legs 58, 62. Accordingly, in some embodiments, when the chair 50 is in a folded configuration, the hinges 56, 60, and 61 and the thicknesses of the seat base 52, seat back 54, and legs 58, 62 may be configured so that the hinges 56, 60, and 61 do not protrude outwardly from the chair 50 when in the folded configuration.

FIG. 11 and FIG. 12 illustrate further details of hinge 56. As illustrated central lock cylinder 67 may have an elongate body that defines a hinge axis 80 about which the coupled furniture pieces rotate. Central lock cylinder 67 be positioned within a plurality of collars and the plurality of collars may couple to the seat base 52, seat back 54, and the back leg 62. The plurality of collars may also have a similar thickness and be adjacent one another to provide a uniform outward appearance. In the illustrated embodiment, the back leg 62 couples to the central lock cylinder 67 via three collars 69. Two collars 69 may be positioned on the ends of hinge 56 and a third collar 69 may be positioned at a center of hinge 56. The seat base 52 may couple to the central lock cylinder 67 via two collars 71. The two collars 71 may be positioned adjacent the edge collars 69 and inwardly therefrom. The seat back 54 may be coupled to the central lock cylinder via two collars 68. Each of the collars 68 may be positioned between one of the collars 71 and the central collar 69.

While the central lock cylinder is illustrated as solid, in other embodiments, the central lock cylinder may be a tube. Further, it should be understood that any number of collars may be used to couple the seat base 52, seat back 54, and leg 62 with central lock cylinder 67 (e.g., one, two, three, four, or more collars). Further, in many embodiments, the order and/or position of the collars along the length of the central lock cylinder 67 may differ. Accordingly, the illustrated array of collars and order/position of collars is exemplary and non-limiting.

In some embodiments, a set of collars (e.g., collars 68, collars 69, or collars 71) may be integral with central lock cylinder 67. For example, the seat base 52 may be fixed to collars 71, however collars 71 may be integrally formed with central lock cylinder 67. In such an embodiment, the integral collars (e.g., collars 71) do not rotate about central lock cylinder 67, while the remaining collars may be configured to rotate about central lock cylinder 67. Advantageously, a fixed/integral set of collars may hold the remaining rotating collars in position along the length of the hinge (e.g., hinge 56). In some embodiments, in order to have a set of collars fixed to the central lock cylinder 67, and the remaining collars held in place along the length of central lock cylinder 67, the chair 50 may be manufactured by additive or three-dimensional printing.

In many embodiments, the hinges (e.g., hinge 56) may be configured to be lockable (e.g., locked and unlocked) to selectively restrict a rotational range of motion between one or more collars, flats, or furniture pieces (e.g., seat back, seat base, legs) relative to the hinge and/or another collar, flat, or furniture piece. In some embodiments, the collars/flats may be locked open (i.e., one or more deployed positions) and/or locked closed (e.g., a folded/flat position). In some embodiments, the central lock cylinder (e.g., central lock cylinder 67) may be translated along the hinge axis (e.g., hinge axis 80) to lock the rotating collars in position by securing a corresponding protrusion (e.g., studs) in a secondary channel (e.g., locking channel). Advantageously, the locking mechanisms (e.g., locking channels, studs, etc.) may all be contained and concealed internally within the hinge 56 and may even be an intrinsic part of the hinge.

Figure 13:
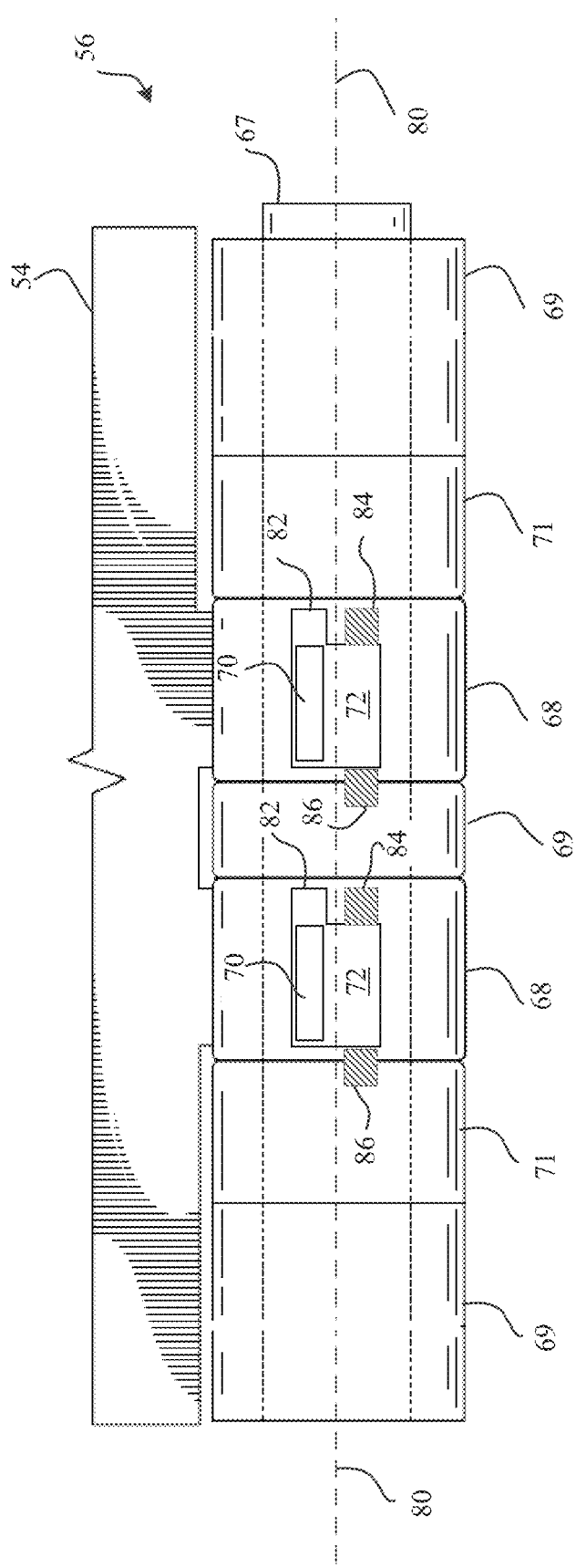
FIG. 13 illustrates the internal workings of an exemplary lockable hinge shown in FIG. 11.
Figure 14:
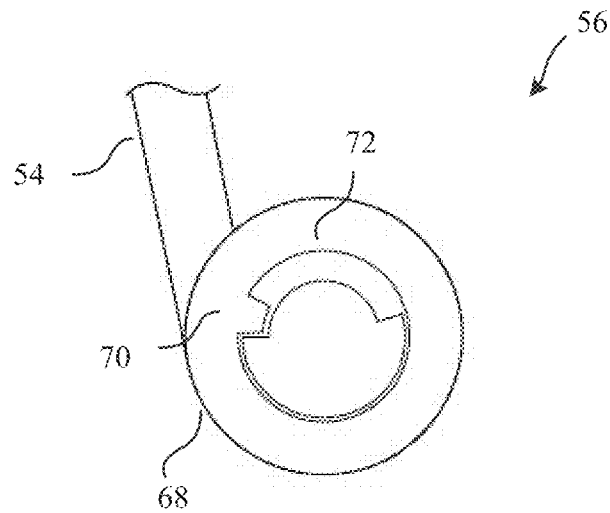
FIG. 14 illustrates a cross-sectional view along the hinge of FIG. 11.
Figure 15:
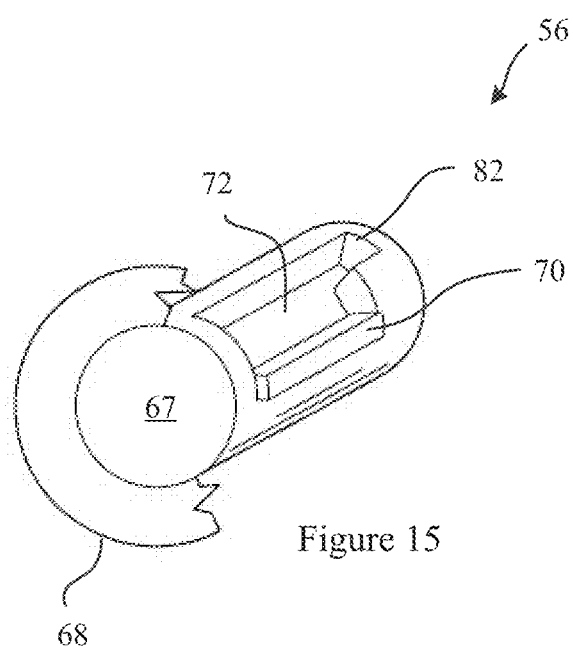
FIG. 15 illustrates the internal workings of exemplary lockable hinge of FIG. 11.

FIG. 13, FIG. 14, and FIG. 15 illustrate the internal workings of exemplary lockable hinge 56. In the embodiment shown, lockable hinge 56 may be configured to lock a seat back 54 (and corresponding collars 68) in a deployed position relative to the hinge cylinder. As illustrated, central lock cylinder 67 may include a recessed surface defining one or more rotate channels 72 that are transverse to the hinge axis 80. Furthermore, central lock cylinder 67 may include a recessed surface defining one or more locking channels 82 that extend from the rotate channels 72 in an axial direction. Collars 68 may each include a stud 70 that projects inwardly from the respective collar 68 into a corresponding rotate channel 72.

In many embodiments the stud 70 has an axial dimension that closely corresponds with an axial dimension of the respective rotate channel 72. In such embodiments, the stud 70 may cooperate with the walls of the rotate channel 72 to restrict axial movement between the collar 68 (and seat back 54) and the central lock cylinder 67. Further, in many embodiments, the stud 70 has an dimension transverse to the axial direction (e.g., angular dimension) that is less than the dimension of the rotate channel 72 that is transverse to the axial direction (e.g., an angular dimension of the rotate channel 72). Accordingly, when a stud 70 is fully positioned in a corresponding rotate channel 72 (i.e., not within the locking channel 82), collars 68 may have a rotational range of motion about central lock cylinder 67 and may be restricted in the axial direction. The rotational range of motion about central lock cylinder 67 may be defined/limited by an angular length of the rotate channel 72. Accordingly, in many embodiments a rotate channel 67 and a corresponding stud 70 may be may be configured to define a rotational degree of freedom and/or an axial degree of freedom of the collar 68 and seat back 54 about and along the central lock cylinder 67.

The locking channels 82 may be configured with an angular dimension that is less than an angular dimension of the rotate channel 72 and may otherwise closely correspond with the angular dimension of a stud 70. When the stud 70 is rotationally aligned with a locking channel 82, the central lock cylinder 67 may be moved in the axial direction to position at least a portion of the stud 70 within the locking channel 82. When at least a portion of the stud 70 is positioned within the locking channel 82, a rotational range of motion of the stud 70, collar 68, and seat back 54 may be reduced compared to a rotational range of motion of the stud 70, collar 68, and seat back 54 when the stud 70 is fully positioned in the rotate channel 72 (i.e., not within the locking channel 82). In many embodiments, when at least a portion of the stud 70 is positioned in the locking channel 82 the corresponding collar 68 and seat back 54 are rotationally locked relative to the central lock cylinder 67 and may be rotationally locked relative to another collar and flat of the hinge mechanism. In the illustrated embodiment, flat (seat back) 54 may be locked in an open or deployed position when at least a portion of the studs 70 are positioned in locking channels 82. Advantageously, the exemplary locking hinge 56 may lock seat back 54 in the deployed position to prevent the seat back 54 from inadvertently rotating back to a closed or folded position along seat base 52.

In some embodiments, rotate channels 72 may include one or more second locking channels 84, 86 extending therefrom in the axial direction that are angularly spaced apart from locking channels 82. The shaded locking channels 84, 86 show optional locations for a second locking channel 84, 86. In some embodiments, one or more second locking channels 84, 86 are positioned at an opposite end of the rotate channel 72 from the locking channel 82. Such a configuration may allow the hinge 56 to lock or otherwise reduce a rotational range of motion of the corresponding stud 70, collar 68, and seat base 54 relative to the central lock cylinder 67 at the other rotational range limit of the stud 70, collar 68, and seat base 54 when the stud 70 is positioned fully within the rotate channel 72. Further, in some embodiments, the locking channels 84 may extend from the rotate channel 72 in an axial direction similar to the first locking channel 82. In such embodiments, the collar 68 and seat base 54 may be locked in a second position (e.g., a closed configuration or other intermediate configuration) by rotationally aligning the stud 70 with the second locking channel 84 and translating the central lock cylinder 67 in the axial direction. With this configuration, the central lock cylinder 67 may be translated in the same direction for locking the seat back 54 in the deployed configuration and the closed configuration. Additionally or alternatively, a second locking channel 86 may be provided where the central lock cylinder 67 locks the collar 68 and seat back 54 in the closed configuration by moving in an axial direction opposite from the axial direction for locking the collar 68 and seat back 54 in the deployed position.

While the locking channels 82 (and potential locking channels 84) are illustrated with a configuration that only receives a portion of studs 70, it should be understood that, the locking channels 82, 84 may be configured with an axial length that accommodates the entire axial length of stud 70. Such a configuration may be beneficial for spreading loads between the collar studs 70 and the central lock cylinder 67.

Further, while the illustrated embodiment is shown with both collars 71 each with a stud 70 projecting inwardly into a rotate channel 72 of central lock cylinder 67, it should be understood that in some embodiments, only one of collars 71 may include the stud 70 projecting inwardly into the rotate channel 72 of central lock cylinder 67 (rotate channel 72 may also be configured with a single rotate channel 72 to correspond with the single stud 70).

Furthermore, optionally, collars 71 may include a plurality of studs 70 for each collar 71 that protrude into one or more rotate channels 72 of central lock cylinder 67. For example, one or more collar of hinge 56 may have a first stud 70 projecting inwardly into a first rotate channel 72 of the central lock cylinder 67 and a second stud 70 projecting inwardly from an opposite side of first stud 70 (e.g., 180 degrees from first stud 70) and into a second rotate channel 72 of the central lock cylinder 67. The first and second rotate channels 72 and first and second studs 70 may have similar configurations that provide a desired rotational range of motion of the collar about the central lock cylinder 67. In some embodiments, such a configuration may be advantageous to spread loads among two or more studs 70 per collar.

Also, while the illustrated embodiment is shown with only one set of collars (i.e., collars 68) including a stud 70 projecting into a rotate channel 72 of central lock cylinder 67, it should be understood that in other embodiments, other collars of hinge 56 (e.g., collars 69, 71) may be configured in a similar way and the central lock cylinder 67 may include corresponding rotate channels 72 and/or locking channels 82, 84, 86 as desired. Further, rotate channels corresponding to different sets of collars may be configured with different angular lengths. Accordingly, in some embodiments of the hinge mechanism, different collars may have different rotational ranges of motion about the central lock cylinder 67. Moreover, the rotate channels may be at different rotational angles relative to one another to provide various rotate angles specific to the collars and the attached components (e.g., furniture pieces, seat base, seat back, legs, etc.).

As discussed above, in some embodiments all or some of the collars may have studs that protrude into a corresponding rotate and/or locking channels of a hinge cylinder. The rotate channels may provide a desired rotational range of motion of the collar about the central lock cylinder 67. The locking channels that extend from the rotate channels may allow the collars to be locked in one or more rotational positions (e.g., open/deployed configuration, closed/flat configuration, and/or one or more intermediate positions between open/deployed and closed/flat configurations) relative to the central lock cylinder 67 and/or other collars and furniture pieces. Further the locking and unlocking of the hinge (e.g., hinge 56) may be performed by pushing/pulling the central lock cylinder 67 in the axial direction. For example, in some embodiments, the central lock cylinder 67 may have an end that is accessible from an end of the hinge 56. The central lock cylinder 67 may then be pushed or otherwise actuated from the end to lock the hinge 56 in a deployed, closed, or intermediate configuration and a portion of central lock cylinder 67 may protrude out the opposite end of hinge 56. To unlock the hinge from the deployed, closed, or intermediate configuration, the protruding end of central lock cylinder 67 may be pushed or otherwise actuated in the opposite direction to unlock the hinge mechanism 56.

Figure 16:
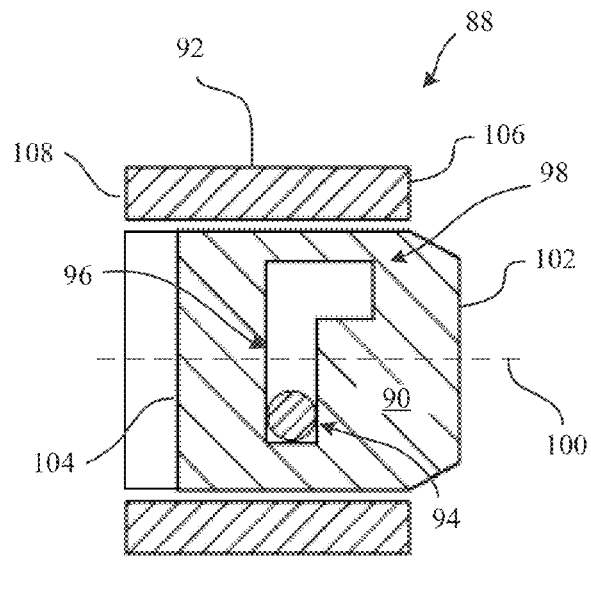
FIG. 16 illustrates an exemplary hinge or hinge portion in a rotate configuration where the collar is free to rotate about the central lock cylinder within its rotational range of motion.
Figure 17:
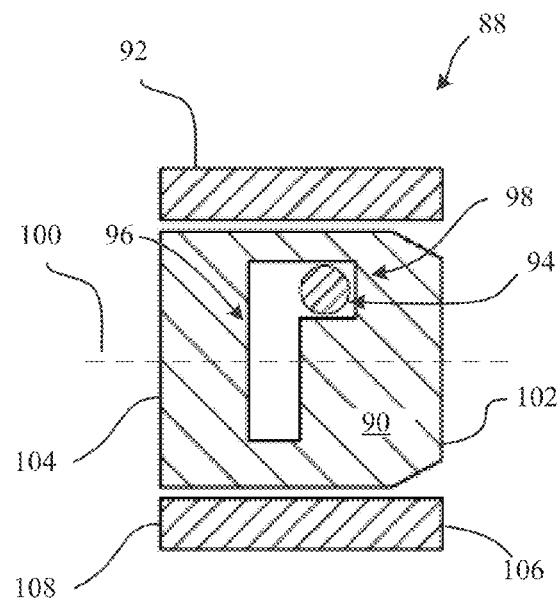
FIG. 17 illustrates the exemplary hinge or hinge portion of FIG. 16 in a lock configuration.

FIG. 16 and FIG. 17 illustrate an exemplary hinge or hinge portion 88. Hinge or hinge portion 88 may include a central lock cylinder 90 and a collar 92 positioned about central lock cylinder 90. The collar 92 includes a stud 94 that projects inwardly into a rotate channel 96 and locking channel 98 of the central lock cylinder. The rotate channel 96 extends transverse to the hinge axis 100 and locking channel 98 extends from the rotate channel 96 in the axial direction. The rotate channel 96 has an angular dimension greater than an angular dimension of the stud 94. Further in some embodiments, the rotate channel 96 has an axial dimension that closely corresponds to the axial dimension of stud 94. The locking channel has a smaller angular dimension than the rotate channel 96 and may be configured to substantially fit the angular dimension of the stud 94.

FIG. 16 illustrates the exemplary hinge or hinge portion 88 in a rotate configuration where the collar 92 is free to rotate about the central lock cylinder 90 within its rotational range of motion and FIG. 17 illustrates the exemplary hinge or hinge portion 88 in a lock configuration. As illustrated in FIG. 16, in some embodiments when the hinge is in the rotate configuration, the central lock cylinder 90 may have an end 102 that protrudes past an end 106 of collar 92 and may also have an end 104 that is pushed or withdrawn within collar 92. In some embodiments, end 102 may be beveled or rounded to avoid sharp edges when the end 102 protrudes from collar 92.

To transition the hinge 88 to the lock position, the stud 95 may be rotationally aligned with the locking channel 98 and the central lock cylinder 90 may be pushed from end 102 or otherwise actuated to position a stud 94 within locking channel 98. As illustrated in FIG. 17, in some embodiments when the hinge 88 is in the locked configuration, the central lock cylinder 90 may have ends 102, 104 that are generally even or flush with ends 106, 108 of collar 92. A locking configuration with the central lock cylinder 90 positioned so that it does not protrude from collar 92 may be beneficial in reducing the chance of inadvertent actuation of the central lock cylinder 90 that may inadvertently transition the hinge mechanism 88 from a locked position to an open position. It should be understood that some exemplary embodiments may utilize only a rotate channel if locking is not desired or needed.

Figures 18, 19:
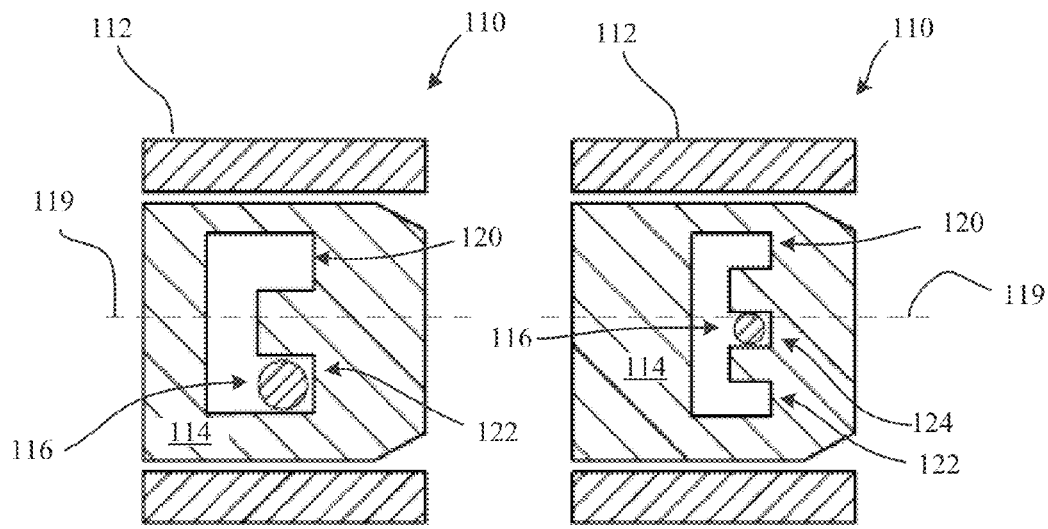
FIG. 18 illustrates an exemplary hinge with a plurality of locking channels located within the central lock cylinder.
FIG. 19 illustrates another exemplary collar, stud, and central lock cylinder design.

FIG. 18 and FIG. 19 illustrate a number of other exemplary collar, stud, and central lock cylinder designs. FIG. 18 shows an exemplary hinge 110. Hinge 110 includes a collar 112 positioned about a central lock cylinder 114. The collar 112 includes a stud 116 that protrudes inwardly into a rotate channel 118 and locking channels 120, 122. The rotate channel 118 may extend transverse to the hinge axis 119 and locking channels 120, 122 may extend from the rotate channel 118 in the axial direction (in the same or opposite directions). The rotate channel 118 may have an angular dimension greater than an angular dimension of the stud 116. Further in some embodiments, the rotate channel 118 may have an axial dimension that closely corresponds to the axial dimension of stud 116 to substantially restrict axial movement between the central lock cylinder 114 and the collar 112 when the stud 116 is not adjacent to a locking channel 120, 122. The locking channels 120, 122 may have a smaller angular dimension than the rotate channel 118 and may be configured to substantially fit the angular dimension of the stud 116. The locking channel 120 may extend in the axial direction at a first end of rotate channel 118 and the locking channel 122 may extend in the axial direction at a second end of the rotate channel 118 that is angularly spaced from and opposite from the first end of the rotate channel 118. Locking channel 120 may correspond to a locked deployed configuration when stud 116 is positioned therein. Locking channel 122 may correspond to a locked closed configuration when stud 116 is positioned therein.

FIG. 19 illustrates a similar embodiment where a third locking channel 124 extends from the rotate channel 118 in the axial direction. The third locking channel 124 may provide an intermediate locking configuration between the fully deployed configuration corresponding to locking channel 120 and the fully closed configuration corresponding to locking channel 122.

While FIG. 18 and FIG. 19 illustrate locking channels 120, 122, 124 extending from the rotate channel 118 in the same direction, it should be understood that one or more of the locking channels 120, 122, 124 may extend in opposite axial directions from one or more of the other locking channels 120, 122, 124 according to some embodiments. Additionally, while embodiments may include more or fewer locking channels as desired (e.g., none, one, two, three, four, five or more).

While many embodiments disclosed herein are generally related to foldable furniture, other embodiments may be related to embodiments of the hinge mechanism disclosed herein. Many embodiments of the hinge mechanism may be used in many different applications outside of foldable furniture where the benefits of such hinges are desired. Accordingly, the hinge collars may be coupled with any type of attachments, and may be constructed from a wide range of materials or combination of materials.

There may be any number of collars on a cylinder. Some collars may be freely rotate about the cylinder and some collars may have limited rotational motion about the cylinder. Some collars may be lockable in one or more positions. Further, the one or more collars may have different or similar angles of rotation about the hinge cylinder. The ability to lock and unlock an array of collars may depend on having the locking channels aligned for each when the cylinder is pushed along the axial direction. Non-locking collar(s) may be part of an array and may similarly be secured on the cylinder by use of a pin fixed to the collar moving in a single rotate channel on the cylinder but having no locking channel. Instead, it may have an extra floating space/width on the rotate-channel to accommodate the cylinder axial translation—thus leaving the collar free to rotate even when the cylinder moves sideways to lock the other collars. The size of each part and the relative proportions between the parts are also variable. In some aspects, it is possible to gang/join together a length of different arrays of collars/cylinder with each array having their own arrangement of locking or non-locking channels activated by the sideways (axial) movement of the hinge cylinder within the array of collars.

In some embodiments, the studs may form an intrinsic part of the collar (integral therewith). In some embodiments, to provide such a configuration, the hinge may be manufactured by additive manufacturing or three-dimensional printing.

Figure 20:
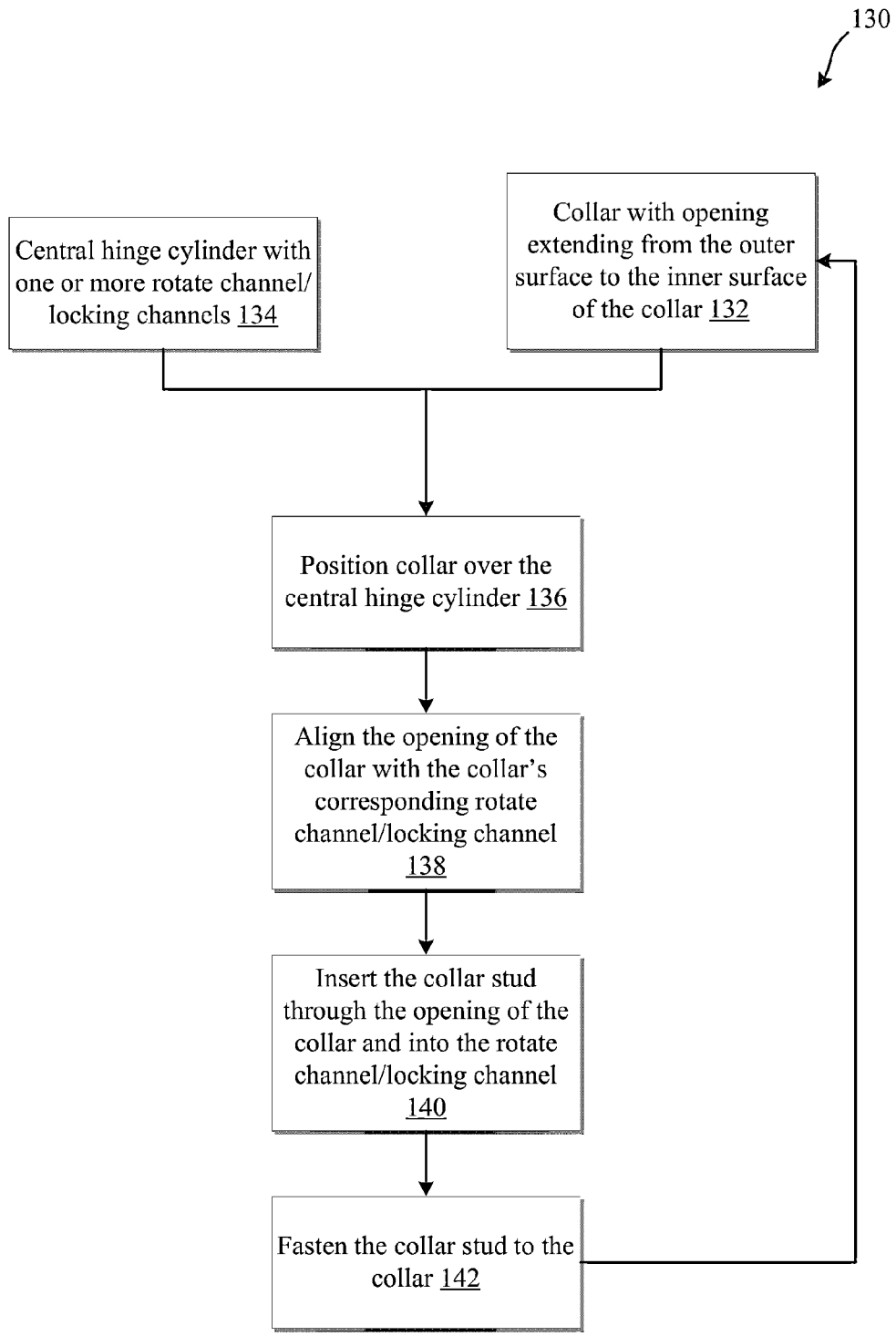
FIG. 20 illustrates an exemplary method of manufacturing a hinge mechanism.

In some aspects of the invention, embodiments of the collar and stud may be separate pieces that are coupled together during manufacturing. FIG. 20 illustrates an exemplary method 130 of manufacturing a hinge mechanism. A collar may be provided 132 that includes an aperture or opening that extends from an outer surface of the collar to an inner surface of the collar. The opening may be configured to receive a stud therethrough. The collar may correspond to a provided central lock cylinder 134 with a rotate and/or locking channel. The collar may be positioned about the central lock cylinder 136. Thereafter, the opening of the collar may be aligned with the collar's corresponding rotate and/or locking channel 138. Once aligned, a collar stud may be inserted through the opening of the collar and into the rotate and/or locking channel of the central lock cylinder 140. The collar stud may then be fastened to the collar 142. The method 130 may continue at step 132 if additional collars are to be added to the hinge mechanism.

Figure 21:
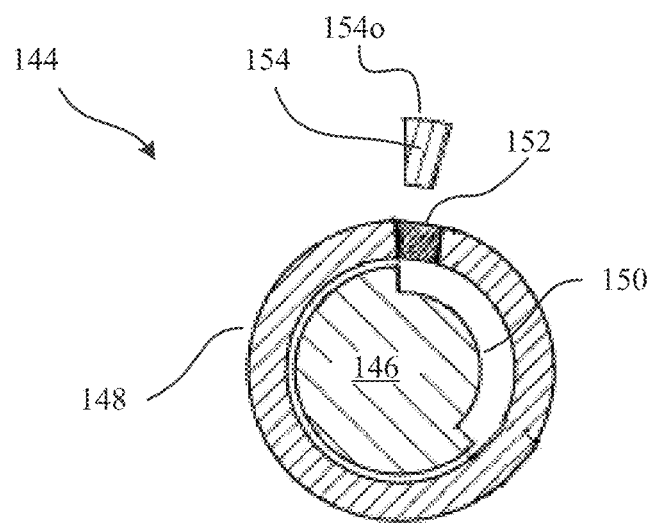
FIG. 21 illustrates an exemplary hinge including a central lock cylinder with a collar having an aperture for receiving a collar stud.

FIG. 21 illustrates an exemplary hinge 144 including a central lock cylinder 146 with a collar 148. The central lock cylinder 146 includes a rotate channel 150 transverse to the central lock cylinder axis. The collar 148 includes an aperture 152 configured to receive a stud 154 therethrough when the aperture 152 is aligned with the rotate channel 150. It should be understood that stud 154 may also be inserted through the aperture 152 when the aperture is aligned with a locking channel (not shown in this cross sectional image).

Stud 154 may have an outer surface 154o that corresponds to a curvature of collar 148. Accordingly, when stud 154 is inserted within aperture 152 and rotate channel 150, outer surface 154o may be substantially uniform with the outer surface of collar 148. Accordingly, after hinge manufacture, hinge 144 may have a uniform outer appearance. In some embodiments the stud 154 may have a round cross-section, an oval cross-section, a rectangular cross-section, a triangular cross-section, or any shape or cross-section configuration. In some embodiments, the stud 154 may be hidden (e.g., integrally formed with the collar), or otherwise revealed.

In some embodiments, the stud 154 (also referred to as a collar pin) may be configured to fittingly mate with aperture 152 (e.g., via engagement features, friction fit, etc.). In some embodiments, the aperture may include engagement features corresponding to engagement features of the stud 154. For example, aperture 152 may include threading engagement features that corresponding to threading engagement features of the stud 154. Accordingly, in some embodiments, a stud 154 may be threaded or otherwise screwed within aperture 152. In some embodiments, the collar stud 154 may be affixed to the collar 148 using other engagement features (e.g., dovetail engagement features), a friction fit design, welding, and/or chemical affixing. Once the stud 154 enters the rotate and/or a lock channel beneath the cylinder and is engaged with or otherwise fixed to the collar, the stud 154 may hold the three components together as the collar(s) cannot slip off the central lock cylinder because of the pin/stud(s) 154. Thereafter, the collar 148 may be constrained to move within the fixed parameters of the rotate channel and/or a lock channel in the central lock cylinder.

Figure 22:
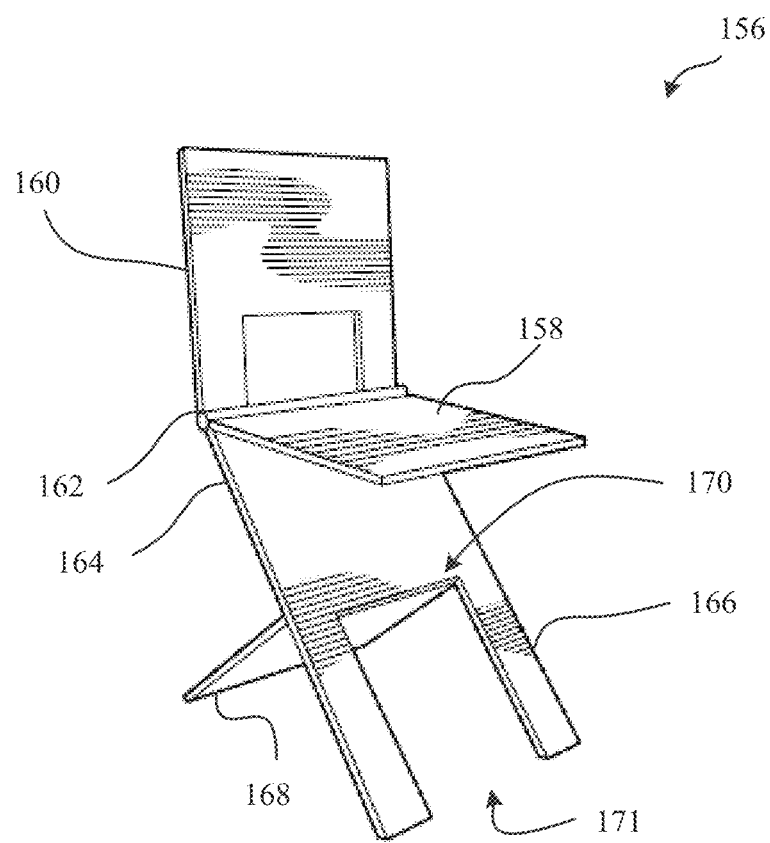
FIG. 22 illustrates an exemplary chair according to some embodiments of the invention.

FIG. 22 illustrates an exemplary chair 156 according to some embodiments of the invention. Exemplary chair 156 may include a seat base 158 coupled with a seat back 160 via hinge 162. A chair leg 164 may also couple with the seat base 158 and the seat back 160 via hinge 162. Chair leg 164 may include a front support section 166 and a back support section 168 that is moveable about a hinge 170 from a flat configuration adjacent front support section 166 to a support configuration that provides chair 156 a support base. Hinge 170 may be configured to limit a rotation of back support section 168 relative to front support section 166 to a rotation range of motion between the flat configuration and the support configuration.

In many embodiments chair 156 may be reconfigurable between a folded configuration and a deployed configuration. In the folded, flat or closed position, seat backrest 154 may fold or rotate about hinge 162 to be along, against, and/or parallel seat base 158; chair leg 164 may also fold or rotate about hinge 162 to be along, against, and/or parallel seat base 158; and back support section 168 of chair leg 164 may be folded to the flat configuration to be along and/or against front support section 166 which may be along, against, and/or parallel seat base 158.

In the deployed configuration, the seat back 160 may fold or rotate about hinge 162 to be at a desired recline angle relative to seat base 158; chair leg 164 may fold or rotate about hinge 162 to a deployed angle relative to seat base 158; and back support section 168 may be moved away from the front support section 166 to the support configuration to provide a support base for chair 156.

In many embodiments, each of seat base 158, the seat back 160, and the chair leg 164 couple with hinge 162 via one or more hinge collars. Hinge 162 may be have a configuration described above (e.g., central lock cylinder with rotate channels and/or locking channels, and collars with inwardly protruding studs) where a central lock cylinder may axially translated relative to the hinge collars to lock the one or more furniture pieces in a desired position (e.g., folded/flat/closed, deployed, and/or one or more intermediate configurations). In some embodiments, one of the furniture pieces (e.g., seat base 158, seat back 160, or chair leg 164) may be integrally formed with the collar and or the central lock cylinder similar to embodiments described above.

Accordingly, in many embodiments, the seat back 160 may couple with a collar and central lock cylinder that are configured to limit a rotational range of motion of the seat back 160 about the central lock cylinder and/or other furniture pieces (e.g., seat base 158). Further, the seat back 160 may couple with a collar and central lock cylinder that are configured to allow the user to selectively lock the seat back 160 in one or more position relative to the central lock cylinder and/or other furniture pieces (e.g., seat base 158). In some embodiments, the seat back 160 may be lockable in the folded configuration were seat back 160 is against and/or parallel the seat base 158, the deployed configuration where the seat back 160 is at the desired recline angle, and/or intermediate configurations where the seat back 160 is at a position between the folded configuration and the intermediate configuration.

In many embodiments, the seat base 158 may couple with a collar and central lock cylinder that are configured to limit a rotational range of motion of the seat back 160 about the central lock cylinder and/or other furniture pieces (e.g., seat back 160, chair leg 162). Further, the seat base 158 may couple with a collar and central lock cylinder that are configured to allow the user to selectively lock the seat base 158 in one or more position relative to the central lock cylinder and/or other furniture pieces (e.g., seat back 160). In some embodiments, the seat base 158 may be lockable in the folded configuration where seat base 158 is against and/or parallel the seat back 160 and/or the deployed configuration where the seat base 158 is in a desired cantilevered angle.

Similarly, in many embodiments, the chair leg 164 may be coupled with a collar and the central lock cylinder that are configured to allow the user to selectively lock the chair leg 164 relative to seat base 158 so that the leg 164 may support the seat base 158. Optionally, the chair leg 164 may be configured to be selectively locked in a folded configuration where the chair leg is against and/or parallel seat base 158. In some embodiments, the hinge mechanism 162 (hinge collars, hinge pins/studs, central lock cylinder, rotate channels, locking channels, etc.) may be configured to lock all three furniture pieces relative to one another in the deployed configuration and/or the folded configuration. Advantageously, a locked folded position may facilitate the moving, transportation, and/or storage of chair 156.

In some embodiments, seat back 160, seat base 158 and chair leg 164 may include corresponding openings that align when the pieces are in the folded configuration. The corresponding openings may provide a handle for convenient gripping by a user for carrying chair 156 in the folded configuration.

Optionally hinge 170 may also be configured according to embodiments disclosed herein for locking back support section 168 relative to front support section 166. In some embodiments back support section 168 may be coupled to a central lock cylinder of hinge 170 via a lockable collar. The back support section 168 may be lockable in the support configuration and/or the flat configuration where the back support section 168 is adjacent and/or parallel to front support section 166. The design of chair leg 164 may be desired as the back support section 168 folds backwardly away from the front support section 166 and creates a central slot 171 in the front support section 166. This central slot 171 may be configured to accommodate a user's feet/legs when the user is sitting on a deployed chair 156.

Figure 23:
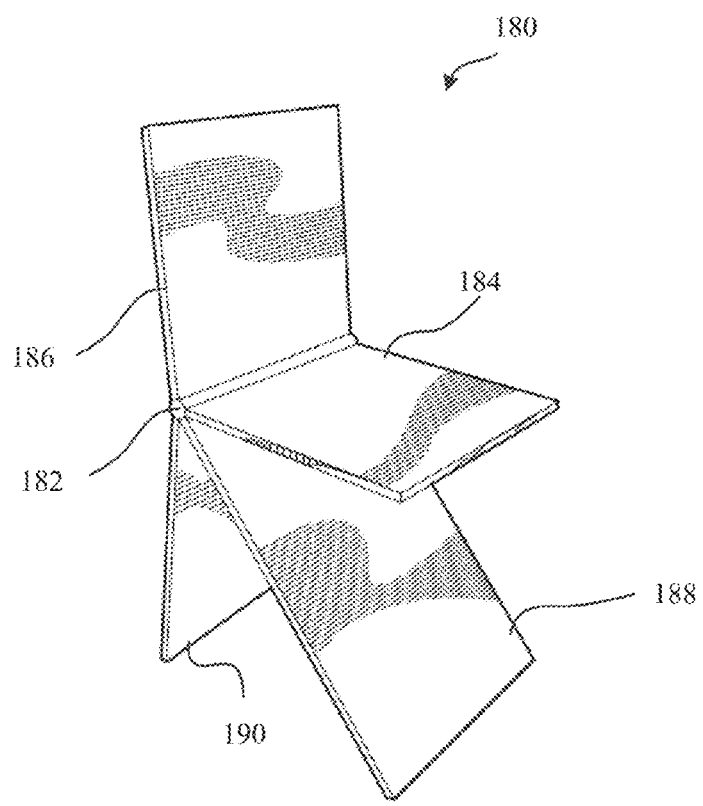
FIG. 23 illustrates yet another embodiment of a folding chair according to some aspects of the invention.
Figure 24:
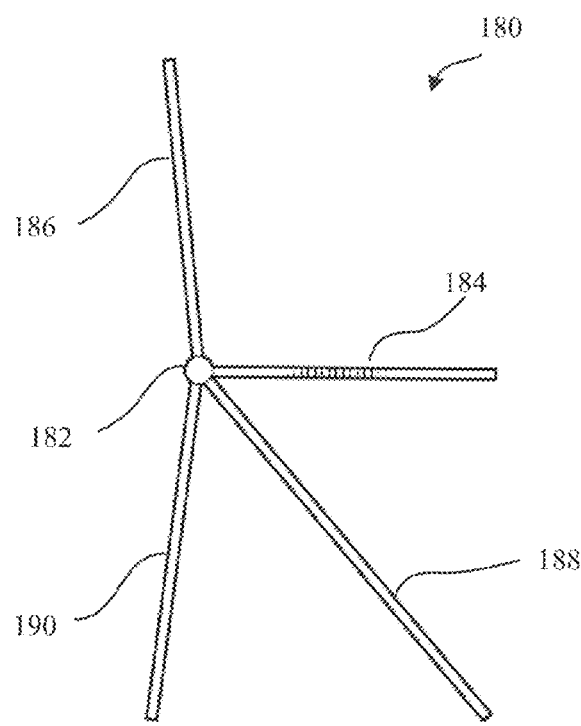
FIG. 24 shows a side view of the folding chair shown in FIG. 23.

FIG. 23 illustrates yet another embodiment of a folding chair 180 according to some aspects of the invention. FIG. 24 shows a side view of the folding chair 180. The chair 180 has one hinge 182 controlling the four flats of the chair 180 (e.g., seat base 184, seat back 186, front leg 188 and back leg 190) which may be locked in the open/deployed configuration and/or the closed/folded configuration. In some embodiments, the four flats may be in the folded configuration when the seat back 186 is against and/or parallel seat base 184 and front leg 188 is against and/or back leg 190. In some embodiments, the four flats may be in the folded configuration when the seat back 186 and the seat base 184 are flat with the front leg 188 and the back leg 190. In further embodiments, chair 180 may be in the folded configuration when the seat back 186 is against and/or parallel with seat base 184; back leg 190 is against and/or parallel front leg 188; and seat base 184 is against and/or parallel front leg 188.

Figure 25:
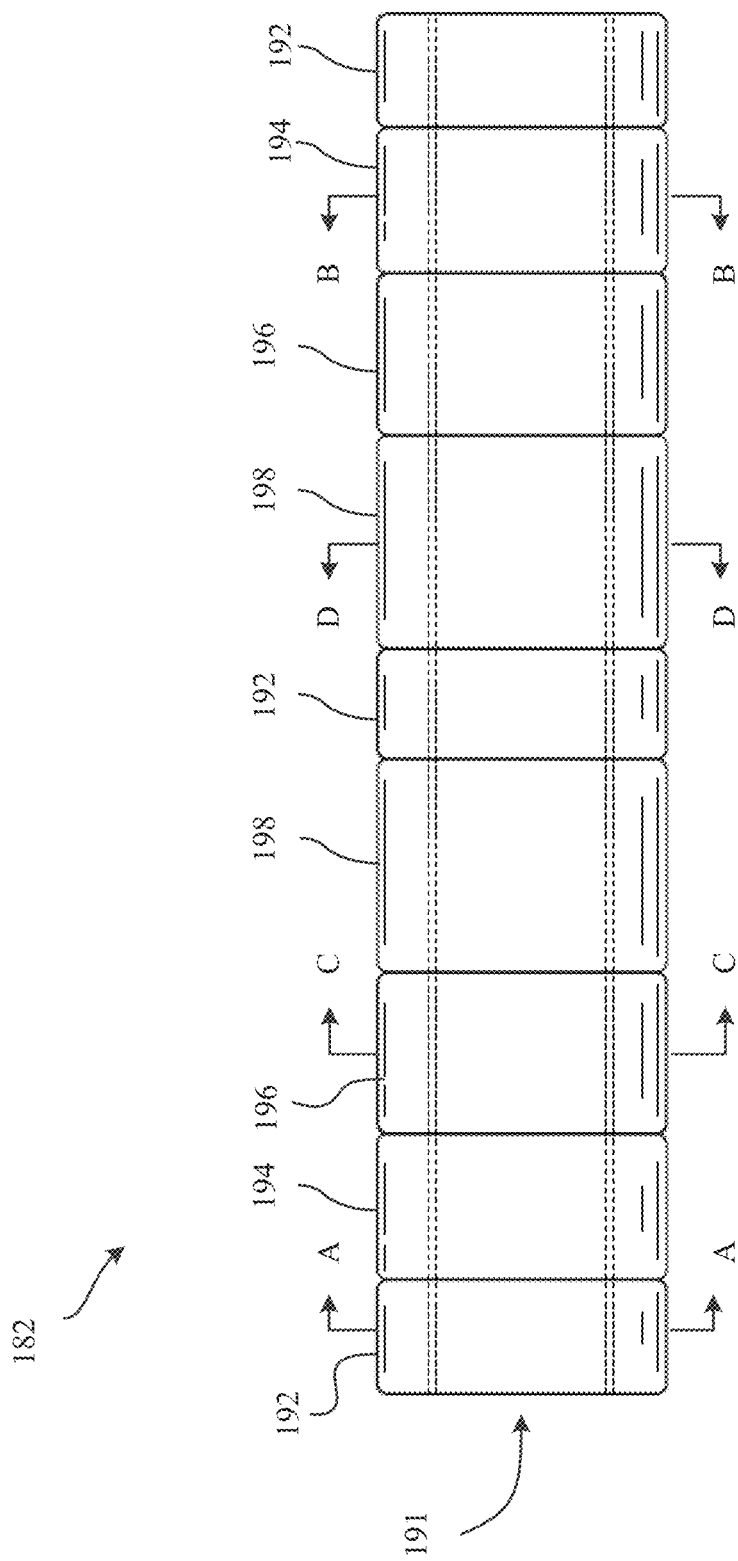
FIG. 25 illustrates a top view of the hinge for the folding chair shown in FIG. 23 and an exemplary arrangement of collars.

FIG. 25 illustrates hinge 182 and an exemplary arrangement of collars. Hinge 182 includes a central lock cylinder 191 positioned within the array of collars. In some embodiments, collars 192 may be coupled with the front leg 188. In some embodiments, collars 194 may be coupled with the back leg 190. In some embodiments collars 196 may be coupled with the seat base 184. In some embodiments, collars 198 may be coupled with the seat back rest 186. The permutation of which flats (e.g., seat base 184, seat back 186, front leg 188, back leg 190) fit on which collars (e.g., collars 192, 194, 196, 198) is open depending on the mechanics.

In some embodiments, the width of the collars (i.e., the axial dimension) may vary to facilitate load distribution along the hinge 182. In the illustrated example of hinge 182, the width of the collars may increase as they approach the center of the hinge 182 to offer greater support and strength as the flats attached to the collars towards the center may have to cope with greater stress as the fixing points approach the center of the hinge 182. This differing collar width may allow for a better distribution of stability, support, and strength across the width of the hinge 182. The width of the hinge may depend on the type of flat attached (e.g., seat base 184, seat back 186, etc.).

Figure 26:
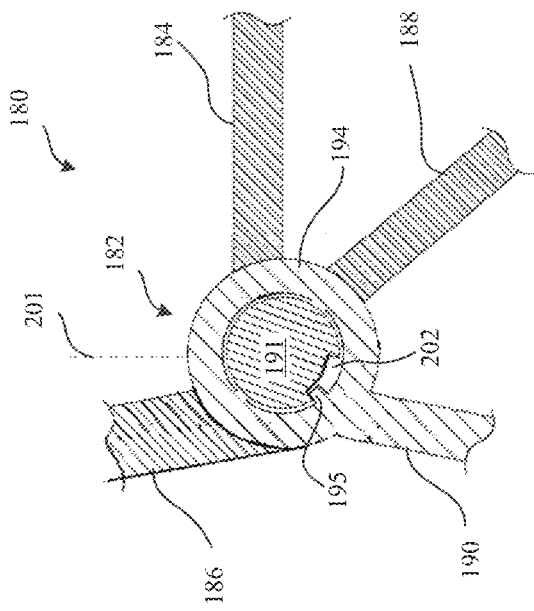
FIG. 26 shows a cross-sectional view of the hinge in FIG. 25 at A-A.

FIG. 26 shows a cross-sectional view of hinge 182 at A-A. Front leg 188 may couple with collar 192. Collar 192 may include a stud 193 that projects into a rotate channel 200 in central lock cylinder 191. The rotate channel 200 may limit a rotational range of motion of front leg 188 and collar 192 about the central lock cylinder 191. In some embodiments, the rotate channel 200 may limit rotation of the front leg 188 and collar 192 from 0-90 degrees from vertical 201. In some embodiments, rotate channel 200 may limit rotation of the front leg 188 and collar 192 to less than 60 degrees from vertical 201 (e.g., less than 30-45 degrees from vertical 201).

Figure 27:
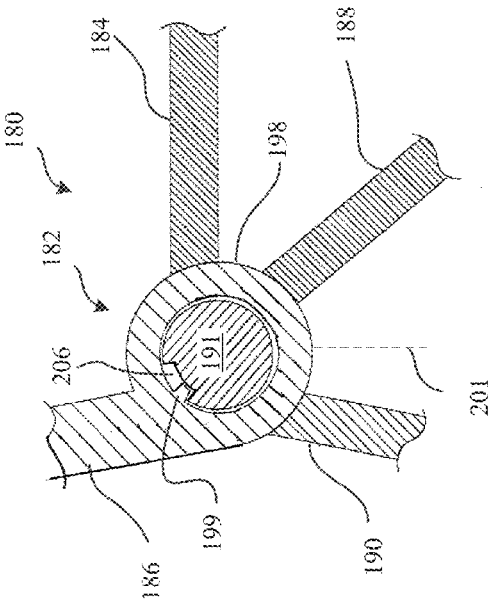
FIG. 27 shows a cross-sectional view of the hinge in FIG. 25 at B-B.

FIG. 27 shows a cross-sectional view of hinge 182 at B-B. Back leg 190 may couple with collar 194. Collar 194 may include a stud 195 that projects into a rotate channel 202 in central lock cylinder 191. The rotate channel 202 may limit a rotational range of motion of back leg 190 and collar 194 about the central lock cylinder 191. In some embodiments, the rotate channel 202 may limit rotation of the back leg 190 and collar 194 from 0-90 degrees from vertical 201. In some embodiments, rotate channel 202 may limit rotation of the back leg 190 and collar 192 to less than 60 degrees from vertical 201 (e.g., less than 30-45 degrees from vertical 199).

Figure 28:
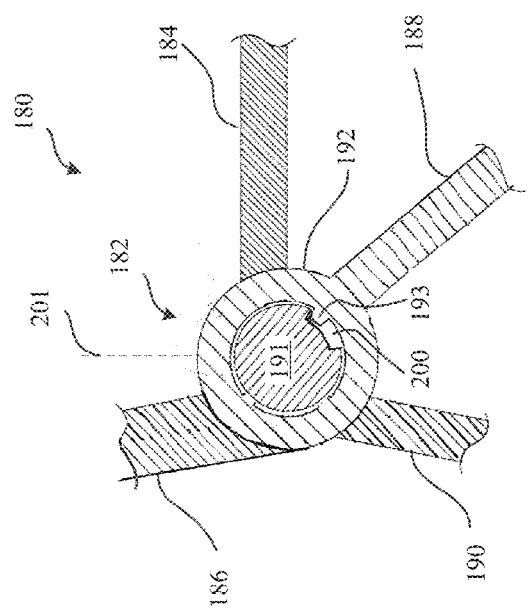
FIG. 28 shows a cross-sectional view of the hinge in FIG. 25 at C-C.

FIG. 28 shows a cross-sectional view of hinge 182 at C-C. Seat base 184 may couple with collar 196. Collar 196 may include a stud 197 that projects into a rotate channel 204 in central lock cylinder 191. The rotate channel 204 may limit a rotational range of motion of seat base 184 and collar 196 about the central lock cylinder 191. In some embodiments, the rotate channel 204 may limit rotation of the seat base 184 and collar 196 from 0-90 degrees from vertical 201.

Figure 29:
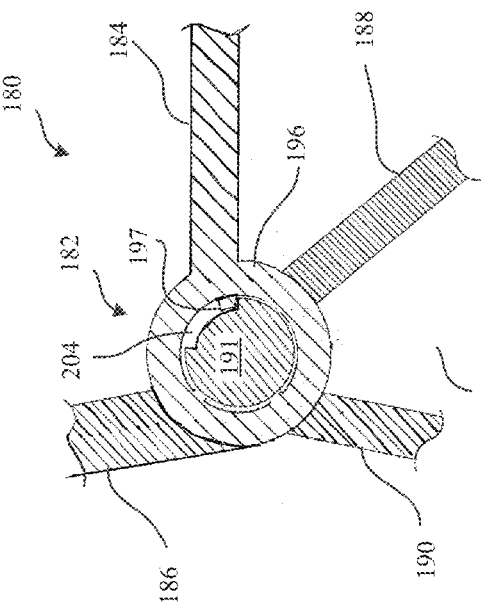
FIG. 29 shows a cross-sectional view of the hinge in FIG. 25 at D-D.

FIG. 29 shows a cross-sectional view of hinge 182 at D-D. Seat back 186 may couple with collar 198. Collar 198 may include a stud 199 that projects into a rotate channel 206 in central lock cylinder 191. The rotate channel 206 may limit a rotational range of motion of seat back 186 and collar 198 about the central lock cylinder 191. In some embodiments, the rotate channel 206 may limit rotation of the seat back 186 and collar 198 from 0-30 degrees from vertical 201. In some embodiments, rotate channel 206 may limit rotation of the seat back 186 and collar 196 to less than 20 degrees from vertical 201 (e.g., from 0-18 degrees from vertical 201, up to 15 degrees from vertical 201 or the like).

In some embodiments, one of the flats (e.g., seat base 184, seat back 186, front leg 188, back leg 190) may be integrally formed with the central lock cylinder. In some embodiments, the central lock cylinder 191 may lock one or more flats in the deployed position by translating in the axial direction and positioning the corresponding stud of the one or more flats in a corresponding locking channel. In some embodiments, the central lock cylinder 191 may lock all the flats in the deployed position by translating in an axial direction and positioning all the corresponding studs of each of the flats in corresponding locking channels. In further embodiments, the central lock cylinder 191 may lock one or more flats in a folded position (e.g., when the flat is parallel to vertical 201) by translating in the axial direction and positioning the corresponding stud of the one or more flats in a corresponding locking channel. In some embodiments the central lock cylinder 191 may lock all the flats in the deployed position by translating in an axial direction and positioning all of the corresponding studs of each of the flats in corresponding locking channels. In further embodiments, the hinge 182 may be configured with locking channels in the central lock cylinder 191 that lock one or more of the flats in intermediate positions.

In some embodiments, the central lock cylinder 191 may translate in a first axial direction to lock the one or more flats in a deployed position and may translate in the first axial direction when locking one or more flats in a folded position. In some embodiments, the central lock cylinder 191 may translate in a first axial direction to lock the one or more flats in a deployed position and may translate in a second axial direction (opposite the first axial direction) when locking one or more flats in the folded configuration.

Also less or more collars may be used and the length of the hinge 182 may vary depending on different needs. The ratios of dimensions and size may vary depending on the properties of the materials used (e.g., steel, aluminum, plastic, etc.) and the manufacturing process (e.g., additive manufacturing, stud insertion, fixation, welding, or the like). Further, the diameter of the collar may vary, the thickness of the flats may vary, and the size and shape of the studs will vary as will the channels in the cylinder.

In some embodiments, the hinge design described herein may provide for foldable furniture that may be configured to fold flat. In some embodiments, the furniture may have a thickness of less than 2.5 inches when in the flat configuration. The flat folded configuration advantageously provides an unprecedented space saving design. Multiple units may be easily stored by hanging them on a wall or out of sign in a cupboard. Further, multiple furniture units (e.g., chairs) may be easily transported as the units can be stacked flat, horizontally or vertically into an easily portable wheeled box. Further, units may be shipped in flat boxes relatively cheaply compared to conventional chairs. In some embodiments, the chairs may include corresponding engagement features that allow multiple chairs to be joined together to form an elongate chair, bench, couch or the like. In some embodiments, the chairs may be joined together in a line or may be joined to form a curved arrangement (e.g., a semi-circle or the like).

Further, while illustrated embodiments are shown with collars having studs protruding inwardly into rotate and/or lock channels of the central lock cylinder, other embodiments of the hinge may have collars with rotate and/or lock channels that are configured to receive a stud extending outwardly from the surface of the central lock cylinder. Further, it should be understood that in some embodiments, some collars of a hinge may include rotate and/or locking channels for receiving a stud extending outwardly from the surface of the central lock cylinder, while other collars of the hinge include studs that project inwardly into rotate and/or locking channels of the central lock cylinder. Accordingly, in some embodiments, features of the collar and central lock cylinder may be reversible and may be configured to provide similar utility.

Figure 30:
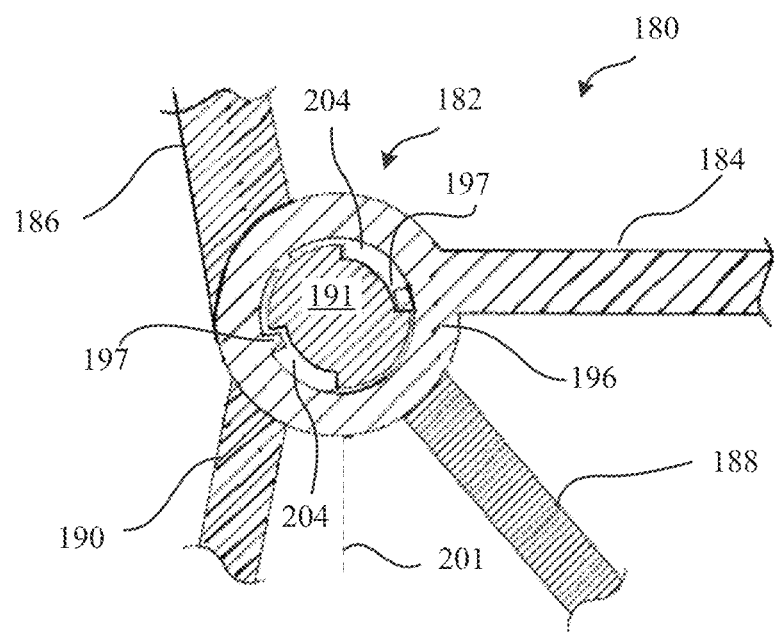
FIG. 30 illustrates another exemplary cross-sectional view of the hinge in FIG. 25 at C-C.

FIG. 30 illustrates another exemplary cross section of hinge 182 at C-C. Seat base 184 may couple with collar 196. Collar 196 may include two studs 197 that project into a respective rotate channel 204 of central lock cylinder 191. Accordingly, in some embodiments, central lock cylinder 191 may include more than one rotate channel (e.g., rotate channel 204) per collar (e.g., collar 196). Such a configuration may help distribute weight to two or more collar studs and to different portions of the central lock cylinder (e.g., central lock cylinder 191). While shown with two studs 197 protruding separately into two rotate channels 204, it should be understood that embodiments of the hinge may have three, four, five, or more studs each protruding into separate rotate channels (e.g., three, four, five, or more rotate channels) of a central lock cylinder.

Figure 31:
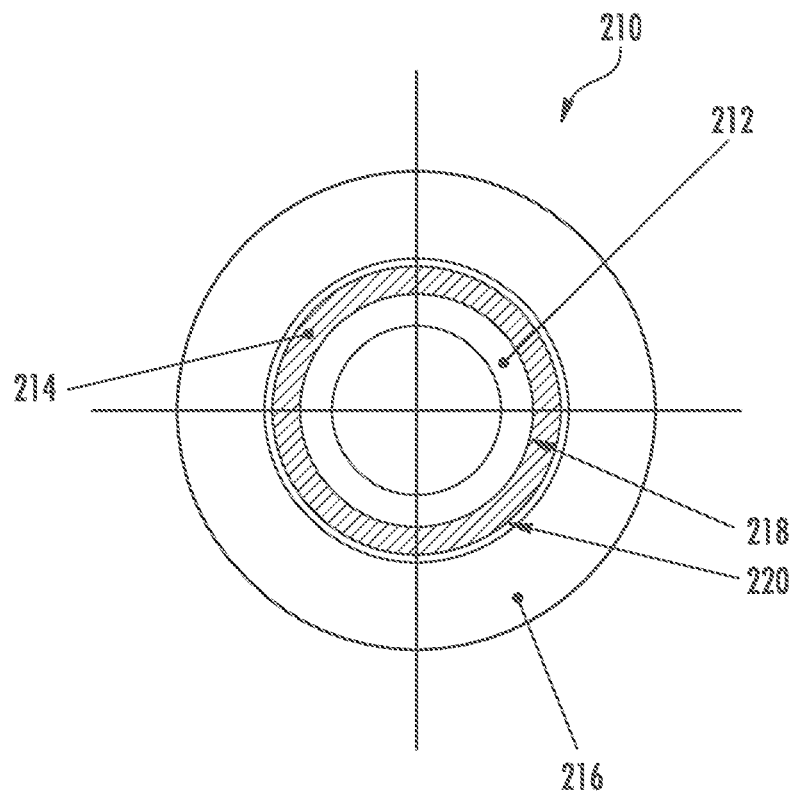
FIG. 31 illustrates an exemplary cross-sectional view of an exemplary hinge according to some embodiments.

FIG. 31 illustrates a cross section of an exemplary hinge 210. Hinge 210 may have a central lock cylinder 212 positioned within an intermediate hinge cylinder 214. The central lock cylinder 212 and intermediate hinge cylinder 214 assembly may be positioned within collar 216. Gap 218 allows the central lock cylinder 212 to rotate relative to intermediate hinge cylinder 214 and collar 216 about the central lock cylinder axis. Gap 220 allows the intermediate hinge cylinder 214 to rotate relative to collar 216 about the central lock cylinder axis. Additionally, the collar 216 of hinge 210 may include collar studs the project inwardly through an aperture or slot in the intermediate hinge cylinder 214 and into rotate/lock channels of the central lock cylinder 212 similar to many of the embodiments described above.

Figure 32:
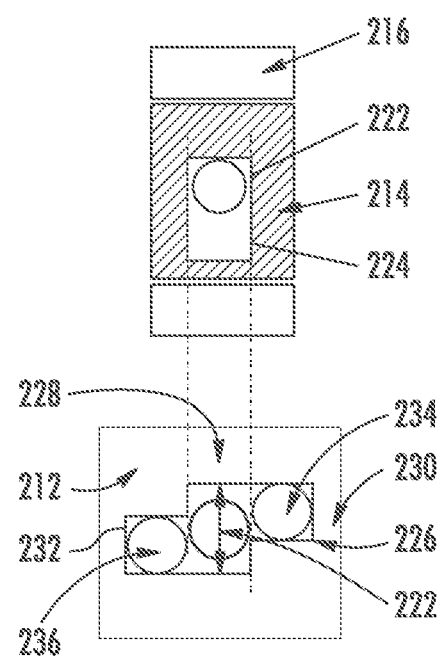
FIG. 32 illustrates the interaction between the components of the hinge shown in FIG. 31.

FIG. 32 illustrates the interaction between the components of hinge 210. Collar 216 may include a collar pin 222 that protrudes inwardly from the collar 216. The pin 222 extends through a slot 224 in the intermediate hinge cylinder 214 and into the channel 226 of the central lock cylinder 212. Channel 226 includes a rotate channel 228 and a first locking channel 230 and a second locking channel 232.

When the collar pin 222 is positioned within the rotate channel 228 and not within the first or second locking channels 230, 232, the collar 216 may rotate relative to the central lock cylinder 212 and the intermediate hinge cylinder 214.

When the collar pin 222 is rotationally aligned with the first locking channel 230, the central lock cylinder 212 may be moved to the left in the axial direction relative to the collar 216 and collar pin 222 to position the collar pin 222 in the locking channel 230. When pin 222 is at position 234, the collar 216 and an attached component may be in a locked deployed configuration.

When collar pin 222 is rotationally aligned with the second locking channel 232, the central lock cylinder 212 may move to the right in the axial direction relative to the collar 216 and collar pin 222 to position the collar pin 222 in the second locking channel 232. When pin 222 is at position 236, the collar 216 and an attached component may be in a locked folded configuration.

Similar to embodiments described above, the collar pin 222 may have many different configurations. In some embodiments the pin 222 may have a circular cross-section, an elongate cross-section, a rectangular cross-section, an oval cross-section, or the like. In some embodiments, the pin 222 may be integrally formed with the collar (e.g., additive manufacturing). In some embodiments, the pin 222 may be inserted through an opening of the collar 216 during hinge 210 assembly and thereafter affixed (welding, chemical affixation) or otherwise engaged with the collar 216 (engagement features, friction fitting engagement, etc.).

In some embodiments the slot 224 of intermediate hinge cylinder 214 includes a width that closely fits pin 222. Accordingly, when the collar 216/pin 222 move in the axial direction, the intermediate hinge cylinder 214 may move in the axial direction along with collar 216/pin 222.

In some embodiments, the slot 224 of the intermediate hinge cylinder 214 has an angular length that closely approximates an angular length of the corresponding rotate channel 228. In many embodiments, the slot 224 may have an angular length that is less than the angular length of the corresponding rate channel 228. Accordingly, in some embodiments, the rotational range of motion of the collar 216/pin 222 may be defined by the angular length of the slot 224 of intermediate hinge cylinder 214. Thus, intermediate hinge cylinder 214 (also referred to as an arc control cylinder) may control the rotational arc of one or more collars of the hinge 210. An intermediate hinge cylinder 214 with slots having an angular length less than an angular length of a corresponding rotate channel of central lock cylinder 212 may prevent the central lock cylinder 212 to be bind up with the weight, friction, and torque of the flats extending from the collars 216 (e.g., seat back, seat base, etc.). The intermediate hinge cylinder 214 may take these forces and may act as the prim pivot, leaving the innermost central lock cylinder 212 free to "float" within the hinge 210. This configuration may make axial movement of the central lock cylinder 212 (e.g., into and out of locking positions) easier and may allow users to slide the central lock cylinder 212 into various configurations.

In some embodiments, to avoid weakening the intermediate hinge cylinder 214 and the central lock cylinder 212, the collars of hinge 210 (e.g., collar 216) may include multiple pins that protrude inwardly through separate slots in the intermediate hinge cylinder 214 and into separate channels in central lock cylinder 212.

Figure 33:
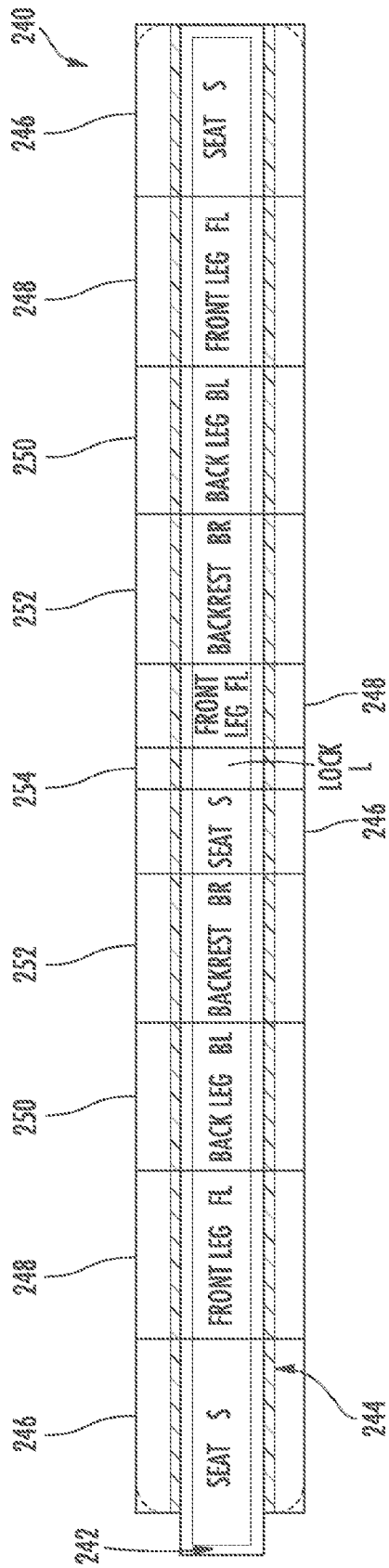
FIG. 33 illustrates an exemplary hinge that may be used for the chair of FIG. 23.

FIG. 33 illustrates an exemplary hinge 240 that may be used for chair 180. Hinge 240 includes a central lock cylinder 242, an intermediate hinge cylinder 244, and an array of collars. The array of collars may include one or more seat base collars 246, one or more front leg collars 248, one or more back leg collars 250, one or more backrest collars 252, and one or more lock collars 254.

In the illustrated embodiment, three seat collars 246 are provided that couple with a seat base 184. The front leg 188 may couple with three front leg collars 248. The back leg 190 may couple with two back leg collars 250. And the seat back 186 may couple with two back rest collars 252.

Figure 34:
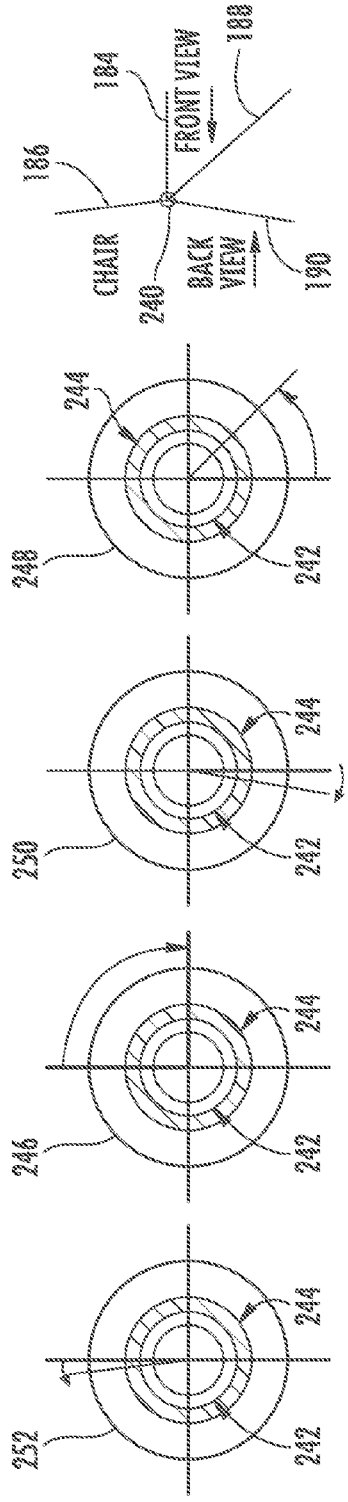
FIG. 34 illustrates exemplary rotational ranges of motion provided for each of the collars of the exemplary hinge of FIG. 33.

FIG. 34 illustrates the rotational range of motion provided for each of the collars 246, 248, 250, 252 about the central hinge axis. The backrest collar 252 may be allowed to rotate between 5-15 degrees from vertical about the hinge axis, preferably 8-12 degree from vertical. The seat base collars 246 may be allowed to rotate around 80-100 degrees from vertical about the hinge axis, preferably 85-95 degrees, and even more preferably about 90 degrees from vertical. In some embodiments, back leg collars 250 may be allowed to rotate around 5-15 degrees from vertical about the hinge axis, preferably about 8-12 degrees from vertical. In some embodiments, front leg collars 248 may be allowed to rotate around 35-65 degrees from vertical about the hinge axis, preferably around 40-50 degrees from vertical.

In many embodiments, the array of collars include pins that protrude into the hinge 240. The pins for the collars may be distributed at different angular positions to spread the load along the intermediate hinge cylinder 244. For example, the collar pins for the seat back collars 252 may be positioned on a back of the hinge 240 (e.g., left from vertical). The collar pins for the seat base collars 246 may be positioned on the front of the hinge 240 (e.g., right from vertical). The collar pins for the back leg collars 250 may be positioned on the front of hinge 240. The collar pins for the front leg collars 248 may be positioned along the back of hinge 240. Accordingly, in some embodiments, and with the collar array illustrated in FIG. 34, the collar pins may be staggered along the length of the hinge 240 thereby spreading the loads within the intermediate hinge cylinder 244 and/or the central lock cylinder 242.

Figure 35:
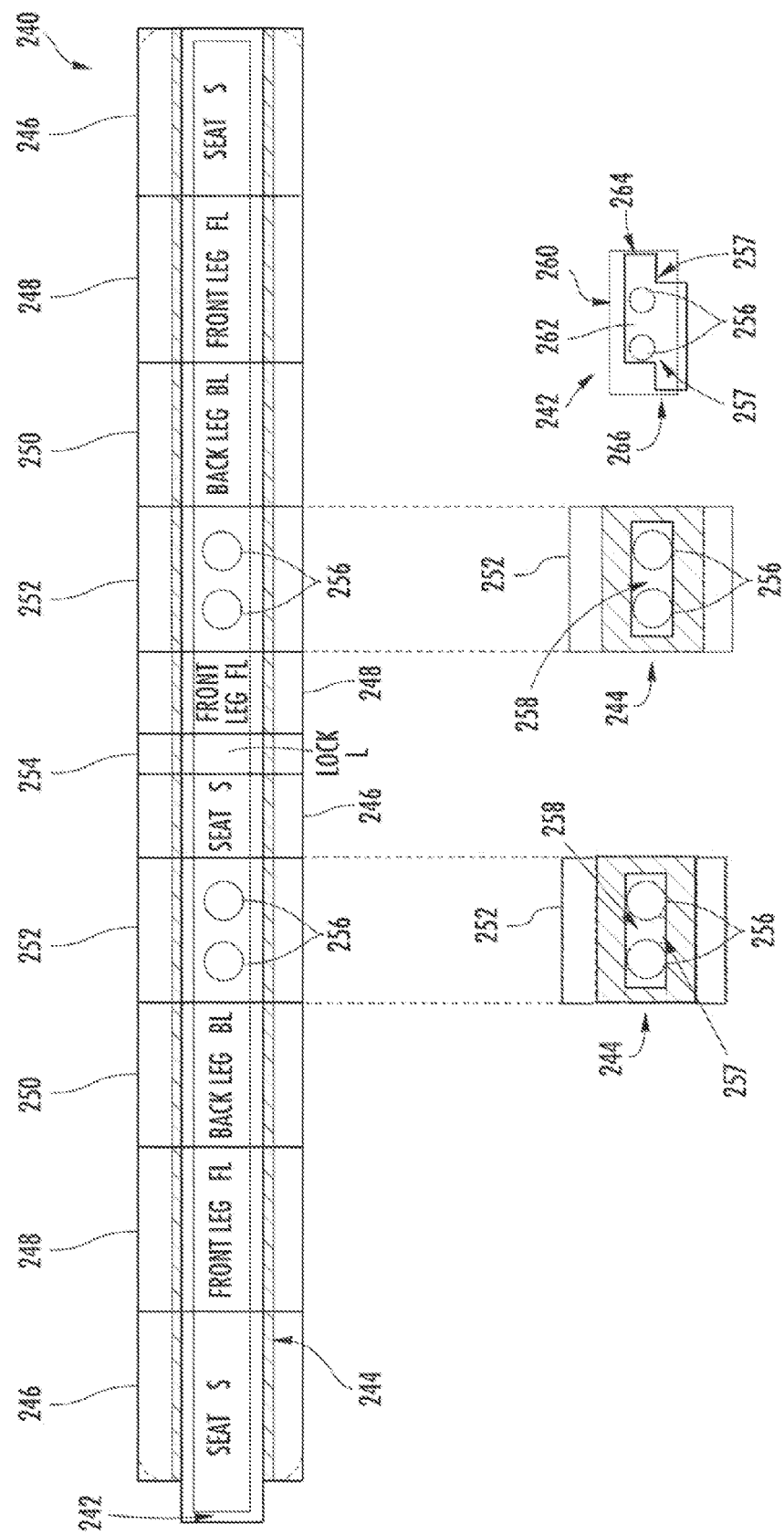
FIG. 35 illustrates exemplary details of backrest collars of the exemplary hinge of FIG. 33.

FIG. 35 illustrates exemplary details of backrest collar 252. Collars 252 may include collar pins 256 that protrude inwardly into hinge 240. In the exemplary embodiment, each collar 252 includes two collar pins 256 that are axially spaced from one another. The collar pins 256 extend through slots 258 of intermediate hinge cylinder 244. The pins 256 may rotate within the cutout section 258 to control the angle of the open/folded positions of the backrest 186. The pins 256 further extend through slots 258 of intermediate hinge cylinder 244 into channel 260 of central lock cylinder 242. Channel 260 includes a rotate channel 262, a first locking channel 264 extending therefrom, and a second locking channel 266 extending therefrom in an opposite direction from the first locking channel 264. Further, in some embodiments, edges 257 are formed between the rotate channel 262 and the locking channels 264, 266. In many embodiments, it may be advantageous to have these corners rounded to facilitate the pins sliding into and/or out of the locking channels 264, 266.

Figure 36:
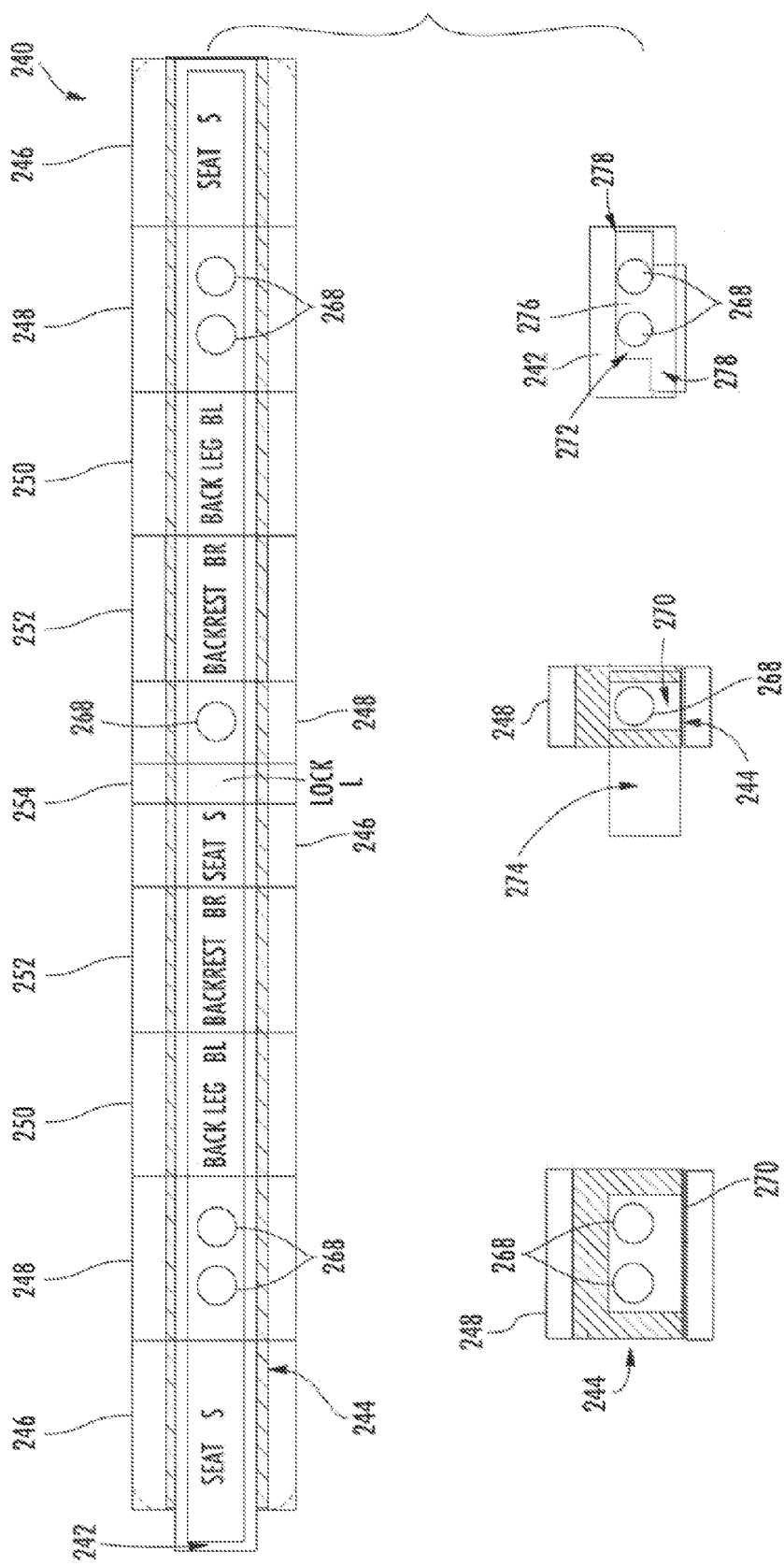
FIG. 36 illustrates exemplary details of front leg collars of the exemplary hinge of FIG. 33.

FIG. 36 illustrates exemplary details of front leg collars 248. Collars 248 may include collar pins 268 that protrude inwardly into hinge 240. In the exemplary embodiment, two of collars 248 each include two collar pins 268 that are axially spaced from one another while a third collar 248 includes a single collar pin 268. The collar pins 268 may extend through slots 270 of intermediate hinge cylinder 244. The pins 268 may rotate within the cutout section 270 to control the angle of the open/folded positions of the front leg 188. The pins 268 of the collars 248 that have two pins 268 each may further extend through slots 270 of intermediate hinge cylinder 244 into channel 272 of central lock cylinder 242. The pin 268 of the collar 248 that has a single pin 268 may extend through slot 270 of intermediate hinge cylinder 244 and into channel 274 of central lock cylinder 242. Channels 272 may include a rotate channel 276 and locking channels 278 extending therefrom. As discussed above, in many embodiments, corners or edges formed between the rotate channel 276 and the locking channels 278 may be rounded to facilitate smooth transitions from a rotate configuration and a locked configuration. Locking channels may be absent for channel 274 as the locking may be performed by the collars 248 which are wider. The channel 274 may have an axial width that is wide enough to allow full side-to-side movement.

As discussed above, in many embodiments, an angular length of a slot (e.g., slots 270) may be shorter than an angular length of an underlying channel (e.g., rotate channel 276, 274). This configuration may avoid the binding of the locking/central lock cylinder 242 due to loads from the flats attached to the collars. The same principles and processes shown in FIG. 35 and FIG. 36 may be followed with respect to the back leg collars 250 and seat collars 246. The back leg collars 250 and seat collars 246 may have different configurations of pins, angles of cutout channels (in the intermediate hinge cylinder 244) and connections to their respective furniture pieces (e.g., back leg 190, seat base 184).

Figure 37:
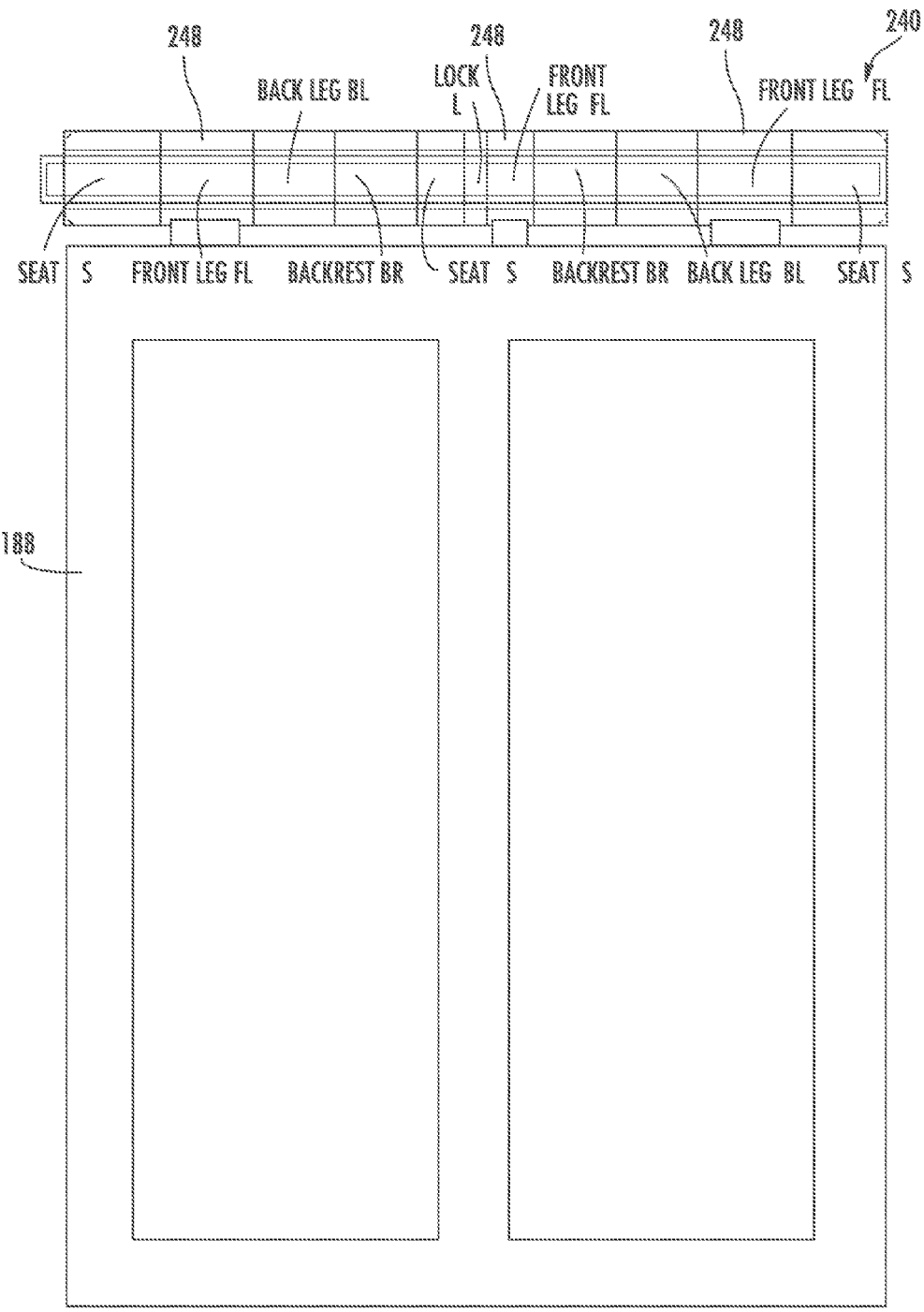
FIG. 37 illustrates an exemplary front leg flat coupled with the exemplary hinge of FIG. 33.

FIG. 37 illustrates an exemplary front leg flat 188 coupled with hinge 240. The front leg flat 188 couples to hinge 240 with intermediate connectors 280. Intermediate connectors may be integral with collars 248 or may be welded thereto. In some embodiments, the connectors 280 may be constructed from wood, plastic, laminate, composite, ceramic, metal, or the like. Connectors 280 may be used throughout or in any combination with component pieces, or not at all. In some embodiments, front leg 188 may be an integral piece generally defined by a rectangular frame. In some embodiments, a central beam may run vertically along the center of the front leg 188 from a top of the rectangular frame to a bottom of the rectangular frame.

Figure 38:
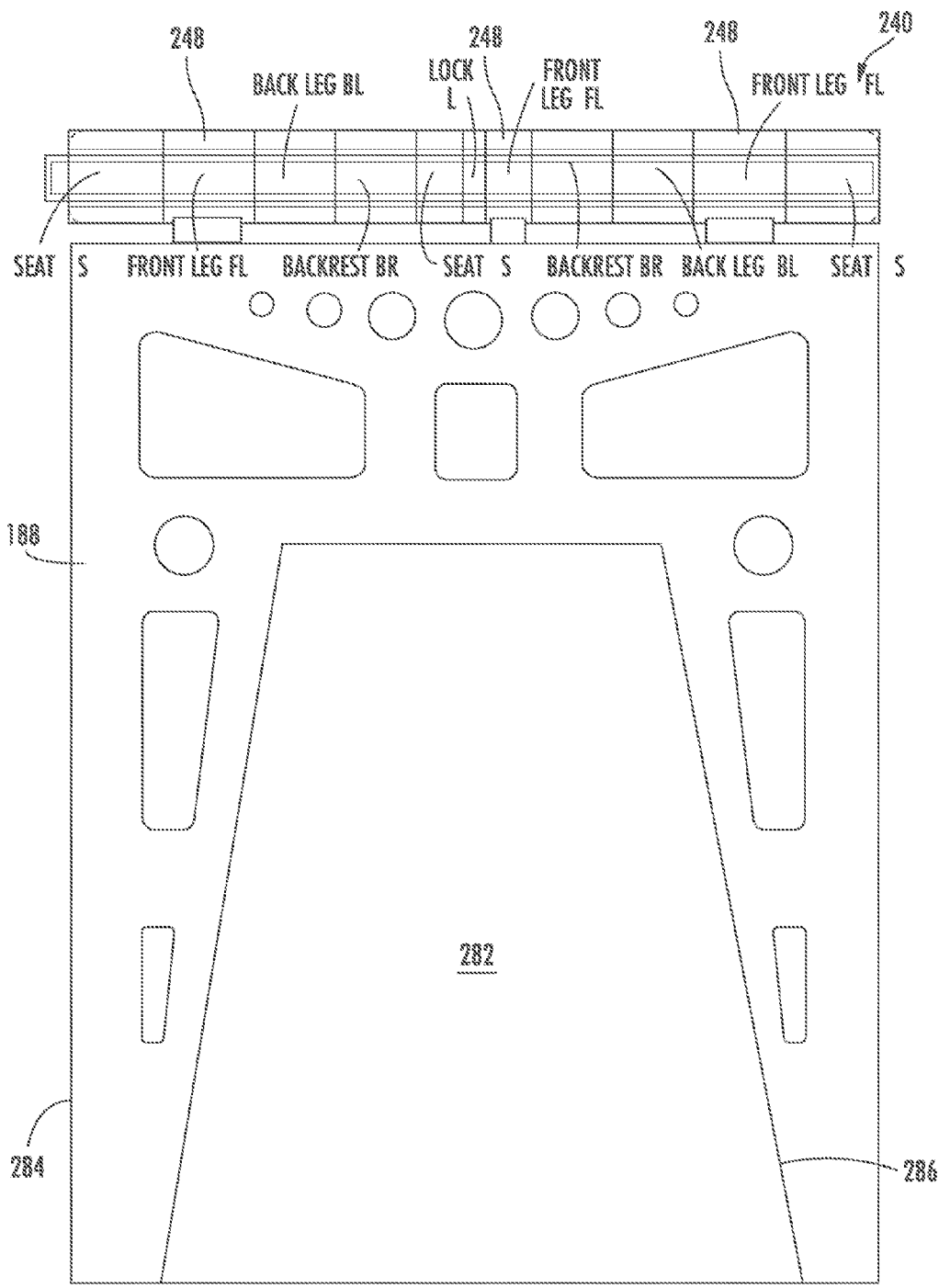
FIG. 38 illustrates another exemplary front leg coupled with the exemplary hinge of FIG. 33.

FIG. 38 illustrate another exemplary front leg 188 coupled with hinge 240. In some embodiments, front leg 188 may be an integral piece generally having a concave cutout portion 282 between a left support 284 and a right support 286 of front leg 188. In some embodiments the concave cutout portion 282 may be beneficial in accommodating a user's legs/feet when the user sits in chair 180. Further, in some embodiments, the front leg 188 may include cutout portions that may provide for material savings during manufacture or that otherwise add to the overall design of the front leg 188 and/or chair 180.

In many embodiments it may be useful to be able to lock embodiments of the hinge in an open position and/or a closed position (or intermediate positions therebetween). In many embodiments, the hinge (and/or chair, table, or other furniture unit) may be locked by constraining the axial movement of the central lock cylinder.

FIG. 39, FIG. 40, and FIG. 41 illustrate the operation of exemplary lock collar 254. Lock collar 254 may be configured to lock the central lock cylinder 242 to prevent the central lock cylinder 242 from translating in the axial direction. Lock collar 254 may include a collar pin 288 that projects inwardly from collar 254 through a slot in the intermediate hinge cylinder 244 and into a channel 290 of central lock cylinder 242. The channel 290 may include an axial translation channel 292 and one or more axial lock channels 294, 296 extending from the axial translation channel 292 in a direction transverse to the axial direction.

In many embodiments the axial lock channels 294, 296 may have an axial width that closely corresponds to the axial width of the collar pin 288. Accordingly, in many embodiments, when collar pin 288 is positioned within one of the axial lock channels 294, 296, the collar pin 288 and the axial lock channels 294, 296 may cooperate to substantially restrict axial movement between the lock collar 254/collar pin 288 and the central lock cylinder 242. Thus, when the central lock cylinder 242 is axially translated to one of its extremes, (e.g., a locked open, a locked closed, or an open position), the lock collar 254 may be rotated to move collar pin 288 into one of the axial lock channels 294 to prevent the central lock cylinder 242 to slide from its current position (e.g., a locked open, a locked closed, or an open position).

In many embodiments, when the collar pin 288 is positioned within the axial translation channel 292 as shown in FIG. 40, the central lock cylinder 242 may axially translate between different positions (e.g., a locked open, a locked closed, or an open position).

FIG. 39 shows when collar pin 288 is positioned within the axial lock channel 294 and when central lock cylinder 242 is positioned at an extreme left position relative to lock collar 254. This central lock cylinder 242 position may be a locked open, a locked closed, or an open position, for example. When collar pin 288 is positioned within the axial lock channel 294, the collar pin 288 and channel 294 prevent central lock cylinder 242 from axially translating from the illustrated position of FIG. 39.

FIG. 41 shows when collar pin 288 is positioned within the axial lock channel 296 and when central lock cylinder 242 is positioned at an extreme right position relative to lock collar 254. This central lock cylinder 242 position may be a lock open, a locked closed, or an open position, for example. When collar pin 288 is positioned within the axial lock channel 296, the collar pin 288 and channel 296 prevent central lock cylinder 242 from axially translating from the illustrated position of FIG. 41.

While the illustrated embodiments are shown with a lock collar having stud(s) protruding inwardly into axial translation and/or axial lock channels of the central lock cylinder, other embodiments of the hinge may have lock collars with axial translation and/or axial lock channels that are configured to receive a stud extending outwardly from the surface of the central lock cylinder. Accordingly, in some embodiments, features of the lock collar and central lock cylinder may be reversible and may be configured to provide similar utility (i.e., locking the axial movement between the lock collar and the central lock cylinder).

FIG. 42 shows another exemplary method and system for locking a central lock cylinder 242 of hinge 240 in an axial direction according to some embodiments. Ends of hinge 240 may have engagement features 298, 299 for engaging with a locking plate 300. When the engagement features 298, 299 are engaged with locking plate 300, the locking plate 300 may be transverse to the hinge axis of the hinge 240 and may thereby impede axial translation of the central lock cylinder 242 past the engaged locking plate 300. Accordingly, the locking plate 300 may prevent axial translation of the central lock cylinder 242 relative to the collar(s) of the hinge 240 and lock the hinge 240 in a desired configuration (e.g., open, closed, intermediate).

In some embodiments, the engagement features (e.g., engagement features 298) may be included on a separate collar 302 positioned at an end of the hinge 240 and coupled with the end collar of hinge 240. In some embodiments, the engagement features (e.g., engagement features 299) may be integral with the collar at the end of the hinge 240 (e.g., collar 246). In some embodiments, the engagement features 298, 299 may engage with corresponding engagement features 304 of locking plate 300.

As illustrated in the exemplary embodiment, the engagement features 299 may be threaded engagement features that are positioned along an internal surface of collar 246 and that are configured to receive the corresponding engagement features 304 along the axial direction. In some embodiments, the locking plate 300 may include a raised grip 306 to aid the user in screwing or unscrewing the locking plate 300.

FIG. 43 shows another view of locking plate 300. The locking plate 300 may have a generally circular footprint that corresponds to a diameter of the hinge 240. In some embodiments, once the locking plate 300 is engaged with hinge 240 to prevent axial translation of the central lock cylinder 242 by a desired amount, the locking plate 300 may be further secured to the hinge 240 by screw 308. When screw 308 is used to engage the locking plate 300 with hinge 240, the screw 308 prevents the locking plate 300 from rotating about its engagement axis and thereby prevents locking plate 300 from disengaging from hinge 240. Accordingly, screw 308 may be used to provide extra security and may be used for a more permanent locking of the hinge 240 in a locked open, closed, or intermediate position. The screw 308 may have a tamper resistant head, such as an Allen head in some embodiments.

Figure 44:
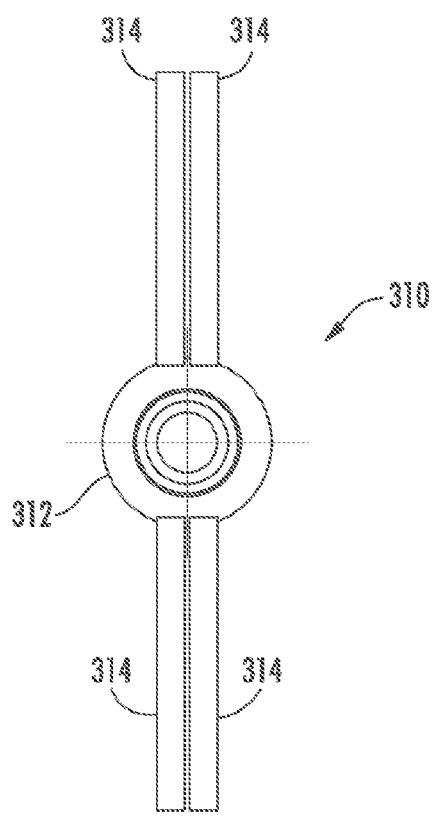
FIG. 44 shows an exemplary hinge (drawing is not to scale) with collars that are directly attached or integrally formed with flats.

FIG. 44 shows an exemplary hinge 310 (drawing is not to scale) with collars 312 that are directly attached or integrally formed with flat substantially planar members ("flats") 314. The flats 314 may form a chair for example. In some embodiments, the flats 314 may be a seat base, a seat back, a first leg, and a second leg. The collars 312 may be integrally formed with the flats (e.g., via additive manufacturing for example) or the flats 314 may be attached or affixed directly to collars 312 with engagement features, welding, chemical affixing, etc.

Figure 45:
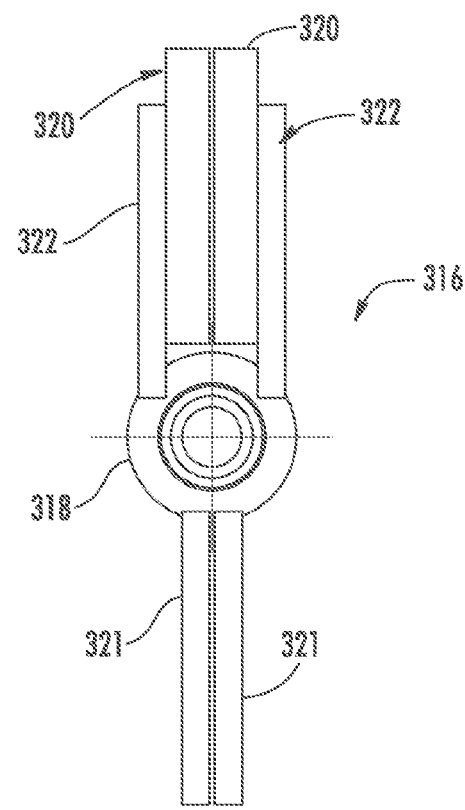
FIG. 45 shows an exemplary hinge (drawing is not to scale) with some collars that couple with separate flats via straight connectors that extend from collars and some collars that are directly attached to or integrally formed with flats.

FIG. 45 shows an exemplary hinge 316 (drawing is not to scale) with some collars 318 that couple with separate flats 320 via straight connectors 322 that extend from collars 318 and some collars 318 that are directly attached to or integrally formed with flats 321. The flats 320 may be a seat base and a seat back for example and flats 321 may be a first leg and a second leg of a chair. The flats 320 may couple with collars 318 via an intermediate connector 322. The intermediate connectors 322 may be integrally formed with collars 318 or may be direct attached or affixed with collars 318. The flats 321 may directly attach or affix to collars 318, similar to embodiments described above.

Figure 46:
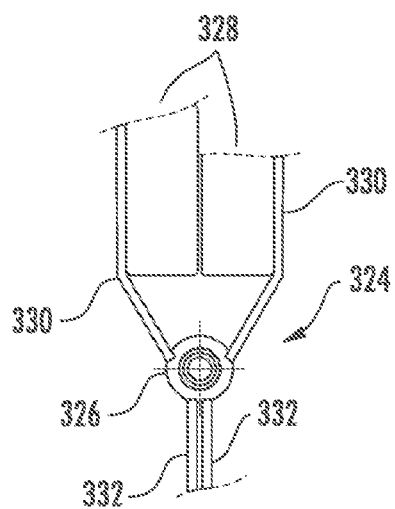
FIG. 46 shows an exemplary hinge (drawing is not to scale) with some collars that couple to separate flats via angled connectors and some collars that couple to directly to or are integrally formed with flats.

FIG. 46 shows an exemplary hinge 324 (drawing is not to scale) with some collars 326 that couple to separate flats 328 via angled connectors 330 and some collars 326 that couple to directly to or are integrally formed with flats 332. Angled connectors 330 may extend straight from collars 326 and may include a bend in the connectors 330. The angled connectors 330 may provide additional clearance for thicker flats 328. Angled connectors 330 may directly attach or affix to collars 326. The flats 332 may be legs of a chair similar to embodiments described above. The flats 332 may directly attach or affix to collars 326.

Figure 47:
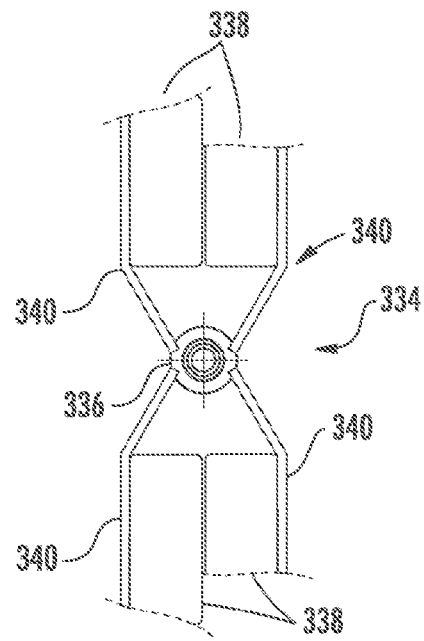
FIG. 47 shows an exemplary hinge (drawing is not to scale) where the collars couple to separate flats via angled connectors.

FIG. 47 shows an exemplary hinge 334 (drawing is not to scale) where the collars 336 couple to separate flats 338 via angled connectors 340. In some embodiments, each of the flats 338 may couple to hinge 334 via angled connectors 340.

Figure 48:
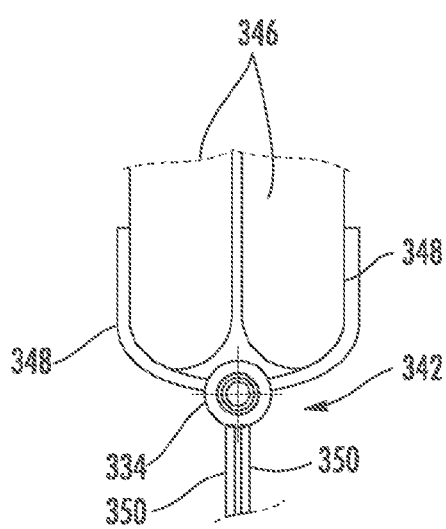
FIG. 48 shows an exemplary hinge (drawing is not to scale) with some collars that couple to separate flats via curved connectors and some collars that couple to directly to or are integrally formed with flats.
Figure 49:
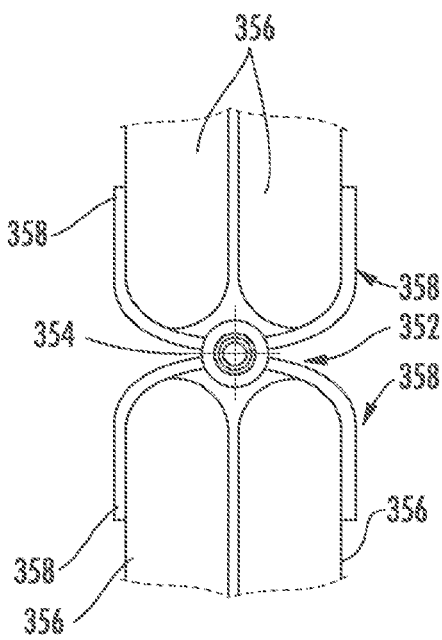
FIG. 49 shows an exemplary hinge (drawing is not to scale) where the collars couple to separate flats via curved connectors.

FIG. 48 shows an exemplary hinge 342 (drawing is not to scale) with some collars 344 that couple to separate flats 346 via curved connectors 348 and some collars 344 that couple to directly to or are integrally formed with flats 350. Curved connectors 348 may extend from collars 334 and may have a rounded bend or along the length of the curved connectors 348. Similar to the angled connectors 330, the curved connectors 348 may provide additional clearance and may provide an alternative outward appearance. FIG. 49 shows an exemplary hinge 352 (drawing is not to scale) where the collars 354 couple to separate flats 356 via curved connectors 358.

Figure 50:
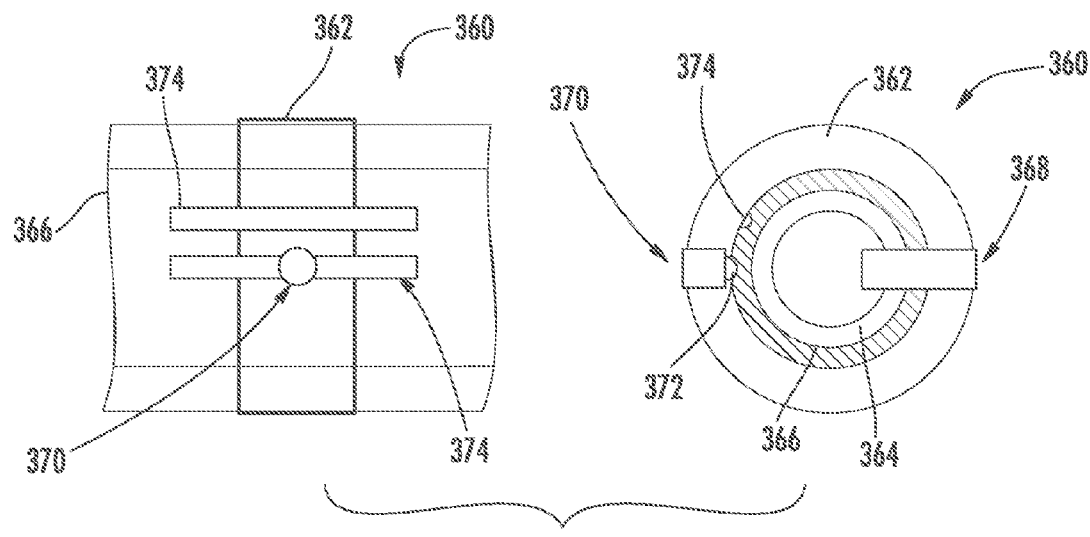
FIG. 50 shows an exemplary method and system for providing tactile feedback for a rotational position of a collar in relation to the central lock cylinder and/or the intermediate hinge cylinder.

In some embodiments, it may be desirable to provide tactile feedback to the user to provide an indication as to a rotational position of the collars in relation to the central lock cylinder and/or the intermediate hinge cylinder. FIG. 50 shows an exemplary method and system for providing tactile feedback for a rotational position of a collar in relation to the central lock cylinder and/or the intermediate hinge cylinder. In some embodiments, a hinge 360 may include a collar 362 that is rotatable about a central lock cylinder 364 and/or an intermediate hinge cylinder 366. The collar 362 may include a collar stud 368 that protrudes inwardly through a slot of the intermediate hinge cylinder 366 and into a channel of the central lock cylinder 364. The collar stud 368 may cooperate with the intermediate hinge cylinder 366 to limit a rotation range of motion of the collar 362 about the intermediate hinge cylinder 366 and the central lock cylinder 368. In some embodiments, the collar 362 may include a tactile stud 370 that protrudes inwardly and that provides tactile feedback indicating a rotation position of the collar 362 relative to the intermediate hinge cylinder 366 and/or the central lock cylinder 368. The tactile stud 370 may include a spring loaded ball bearing 372 that is biased to protrude inwardly into one or more horizontal grooves 374 along the outer surface of intermediate hinge cylinder 366. As the collar 362 rotates relative to intermediate hinge cylinder 366, the spring loaded ball bearing 372 of tactile stud 370 may click into each of the horizontal grooves 374, giving tactile feedback to the user and loosely restraining the collar 362 in each position. The tactile feedback system shown with collar 362 may be used, for example, with lock collar 254 of FIG. 39 through FIG. 40.

Figure 51:
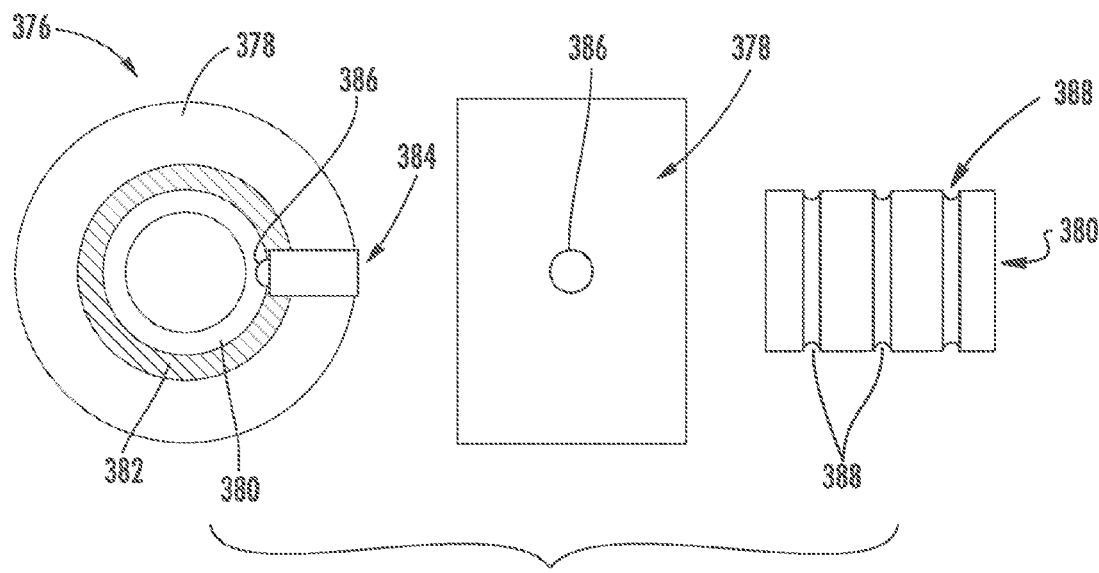
FIG. 51 illustrates an exemplary hinge that provides tactile feedback to the user as the user pushes a central lock cylinder between locked and unlocked positions.

In some embodiments, it may be desirable to provide tactile feedback to the user to provide an indication as to the axial position of the collars in relation to the central lock cylinder when the user is pushing the central lock cylinder through a lock-unlock-lock cycle. FIG. 51 illustrates an exemplary hinge 376 that provides tactile feedback to the user as the user pushes a central lock cylinder between locked and unlocked positions. The hinge 376 may include a collar 378 that is rotatable about a central lock cylinder 380. The hinge 376 may also include an intermediate hinge cylinder 382 positioned between the central lock cylinder 380 and the collar 378. In some embodiments, the collar 378 may include a tactile feedback stud 384 that protrudes inwardly to the central lock cylinder 380. The tactile feedback stud 384 may include a spring loaded ball bearing 386 that is biased to protrude inwardly into one or more vertical grooves 388 of central lock cylinder 380. The vertical grooves 388 may be axially spaced apart. Accordingly, as the central lock cylinder 380 is translated axially, the spring loaded ball bearing 386 of the tactile feedback stud 384 may click into each of the vertical grooves 388, giving tactile feedback to the user indicating a axial position relationship between the collar 378 and the central lock cylinder 380.

In some embodiments, one or more solenoids may be used to control the locking/opening/locking sequence of the internal central lock cylinder. FIG. 52 shows an exemplary hinge 390 which may use a solenoid to control the locking and unlocking of the hinge 390. The hinge 390 may include a central lock cylinder 392 positioned within one or more collars 394. An intermediate hinge cylinder 393 may be positioned between the central lock cylinder 392 and the array of collars 394. In some embodiments, the collars 394 may couple with connectors 396 that couple with hinge flats. In other embodiments, the collars 394 may couple directly with hinge flats. While illustrated with five collars/connectors, it should be understood that any number of collars, flats, and/or connectors may be used. In some embodiments, the hinge 390 may have closed ends. A solenoid 398 may be positioned at one end of the hinge 390 and may be coupled with central lock cylinder 392. The solenoid 398 may be configured to control an axial position of central lock cylinder 392. In some embodiments, a spring 400 may be positioned at an end of the hinge 390 that is opposite of solenoid 392. Spring 400 may be configured to bias the central lock cylinder 392 in a desired direction. For example, spring 400 may compress against the end of central lock cylinder 392 to bias the cylinder 392 to the right, (e.g., toward solenoid 398). In some embodiments, the spring 400 may be biased to tension the cylinder 392 toward the left (e.g., away from solenoid 398).

In some embodiments, separate solenoids may be used to control separate sections of one hinge (e.g., a hinge with two separate central lock cylinder). FIG. 53 illustrates an exemplary hinge 402. Hinge 402 includes a first array of collars 404 that are rotatable about a first central lock cylinder 406 and a second array of collars 408 that are rotatable about a second central lock cylinder 410. An intermediate hinge cylinder 412 may be positioned between the first array of collars 404 and the first central lock cylinder 406. Intermediate hinge cylinder 412 may also be positioned between the second array of collars 408 and the second central lock cylinder 410. The collars 404, 408 may include collar studs 414 that protrude inwardly through the intermediate hinge cylinder 412 and into the first and second central lock cylinder 406, 408, respectively. A first solenoid 416 may be coupled with a first end of first central lock cylinder 406. A second solenoid 418 may be coupled with a first end of second central lock cylinder 408. In some embodiments, the first solenoid 416 is positioned at an end of hinge cylinder 390. The second solenoid 418 may be positioned at an end of hinge cylinder 390 that is opposite of first solenoid 416. In some embodiments, a spring 420 may be positioned between the first central lock cylinder 406 and the second central lock cylinder 410. In some embodiments, the spring may be compressed to bias each of the central lock cylinder 406, 410 toward their respective solenoids 416, 418. In some embodiments, the spring 420 may apply tension between the first central lock cylinder 406 and the second central lock cylinder 410 to bias each of the cylinders away from their respective solenoids 416, 418.

While illustrated in this specific configuration, it should be understood that the hinge 402 is provided by way of example and is non-limiting. Many alternative configurations are possible within the scope of the present invention. For example, in some embodiments, more than two central lock cylinders may be provided in a single hinge. Further, in some embodiments, a spring may not be provided to bias central lock cylinders in an axial direction.

Accordingly, embodiments of the hinge may be used as a mechanical controller as it, internally, can lock-unlock-lock the one or more collars and thus anything connected to it (e.g., directly or via connectors 396). The hinge may be any size and as such the locking and unlocking action may be facilitated by the solenoid. For example, embodiments of the hinge may be used vertically to control the opening and closing of any number of room dividers which can fold and open to angles and positions defined by the hinge's inbuilt geometry. In some embodiments, a mechanical/electrical drive mechanism may be provided for opening and closing the hinge. The drive mechanism may be coupled with the intermediate hinge cylinder and/or the collars. Accordingly, in some embodiments, the hinge may be controlled entirely internally and may offer a compact control mechanism to control angels and to also lock/unlock flats attached thereto.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

What is claimed is:

1. A hinge mechanism comprising:
    a central lock cylinder having an elongate length defining a hinge axis, the central lock cylinder comprising:
        a first rotate channel transverse to the hinge axis, the first rotate channel including a first end and a second end and an angular length therebetween;
        a first locking channel extending from the first rotate channel in an axial direction;
        a second rotate channel transverse to the hinge axis, the second rotate channel including a first end and a second end and an angular length therebetween, wherein the angular length of the second rotate channel is different than the angular length of the first rotate channel or an angular position of the second rotate channel is different than an angular position of the first rotate channel;
        a second locking channel extending from the second rotate channel in an axial direction;
    a first collar disposed about the central lock cylinder, the first collar comprising a first collar pin protruding inwardly from the first collar into the first rotate channel of the central lock cylinder;
    a second collar disposed about the central lock cylinder, the second collar comprising a second collar pin protruding inwardly from the second collar into the second rotate channel of the central lock cylinder;
    an intermediate hinge cylinder positioned between the central lock cylinder and the first and second collars, the intermediate hinge cylinder rotatable relative to the central lock cylinder about the hinge axis and extending axially between the first collar and second collar, the intermediate hinge cylinder comprising:
  a first slot opening associated with the first rotate channel of the central lock cylinder, the first slot opening having an angular length less than or equal to the angular length of the first rotate channel of the central lock cylinder and wherein the first collar pin of the first collar protrudes inwardly through the first slot opening of the intermediate hinge cylinder and into the first rotate channel of the central lock cylinder;
  a second slot opening associated with the second rotate channel of the central lock cylinder, the second slot opening having an angular length less than or equal to the angular length of the second rotate channel of the central lock cylinder and wherein the second collar pin of the second collar protrudes inwardly through the second slot opening of the intermediate hinge cylinder and into the second rotate channel of the central lock cylinder;
wherein the intermediate hinge cylinder reduces binding of the first and second collar pins of the first and second collar on the central lock cylinder about the axis of the central lock cylinder;
wherein the first collar pin of the first collar cooperates with the first rotate channel to limit an axial range of movement between the first collar and the central lock cylinder in the axial direction;
wherein the first collar has a rotational range of motion about the hinge axis relative to the central lock cylinder when the first collar pin is positioned within the first rotate channel; and
wherein the second collar pin of the second collar cooperates with the second rotate channel to limit an axial range of movement between the second collar and the central lock cylinder in the axial direction;
wherein the second collar has a rotational range of motion about the hinge axis relative to the central lock cylinder when the second collar pin is positioned within the second rotate channel and wherein the rotational range of motion of the second collar is different than the rotational range of motion of the first collar;
wherein, when the first collar pin of the first collar is rotationally aligned with the first locking channel and the second collar pin of the second collar is rotationally aligned with the second locking channel, the central lock cylinder is movable in the axial direction relative to the first collar, the second collar, and the intermediate hinge cylinder to transition the hinge mechanism into a first locking configuration where at least a portion the first collar pin of the first collar is positioned within the first locking channel and at least a portion of the second collar in of the second collar is positioned within the second locking channel; and
wherein, when the portion of the first collar pin of the first collar is positioned within the first locking channel, the rotational range of motion of the first collar about the hinge axis relative to the central lock cylinder is reduced;
wherein, when the portion of the second collar pin of the second collar is positioned within the second locking channel, the rotational range of motion of the second collar about the hinge axis relative to the central lock cylinder is reduced; and
wherein, when the portion of the first collar pin of the first collar is positioned within the first locking channel and the portion of the second collar pin of the second collar is positioned within the second locking channel, a rotational range of motion of the first collar relative to the second collar about the hinge axis is reduced.

2. The hinge mechanism of claim 1, wherein the first locking channel extends from the first end of the first rotate channel, and wherein the central lock cylinder further includes a third locking channel extending from the second end of the first rotate channel in the axial direction;
  wherein, when the first collar pin of the first collar is rotationally aligned with the third locking channel, the central lock cylinder is movable in the axial direction relative to the first collar to transition the hinge mechanism into a second locking configuration where at least a portion the first collar pin of the first collar is positioned within the third locking channel; and
  wherein, when the portion of the first collar pin of the first collar is positioned within the third locking channel, the rotational range of motion of the first collar about the hinge axis relative to the central lock cylinder is reduced.

3. The hinge mechanism of claim 2, wherein the first locking channel and the third locking channel extend from the first rotate channel in opposite directions.

4. The hinge mechanism of claim 2, further comprising a first flat associated with the first collar and a second flat associated with the second collar, wherein the first locking configuration of the hinge mechanism comprises a closed configuration of the hinge mechanism where the first flat and second flat are locked in a configuration parallel to one another, and wherein the second locking configuration comprises an open configuration of the hinge mechanism where the first flat and second flat are locked with a desired angle between one another.

5. The hinge mechanism of claim 1, wherein the intermediate hinge cylinder further houses a spring that biases the central lock cylinder in the axial direction toward the hinge mechanism's first locking configuration.

6. The hinge mechanism of claim 1, wherein the central lock cylinder further comprises:
  an axial channel extending in the axial direction;
  an axial lock channel extending from the axial channel in a direction transverse to the hinge axis; and
  wherein the hinge mechanism further comprises a locking collar, the locking collar comprising a locking collar pin protruding inwardly through the intermediate hinge cylinder and into the axial channel;
  wherein the central lock cylinder has an axial range of motion relative to the first collar, second collar, and intermediate hinge cylinder when the locking collar is rotated such that the locking collar pin is positioned within the axial channel; and
  wherein the axial range of motion between the central lock cylinder and the first collar, second collar, and intermediate hinge cylinder is reduced when the locking collar is rotated such that the locking collar pin is positioned within the axial lock channel.

7. The hinge mechanism of claim 1, further comprising a hinge endplate attachable to an end of the hinge mechanism to reduce an axial range of motion between the central lock cylinder and the first collar, second collar, and intermediate hinge cylinder.

8. A furniture unit comprising the hinge mechanism of claim 1.

9. The furniture unit of claim 8, wherein the furniture unit comprises a seat deployable between a folded position and a deployed position.

10. The furniture unit of claim 8, wherein the furniture unit comprises a table deployable between a folded position and a deployed position.

11. A hinge mechanism comprising:
- a central lock cylinder having an elongate length defining a hinge axis, the central lock cylinder further including a first rotate channel transverse to the hinge axis at a first portion of the central lock cylinder, a first locking channel extending from the first rotate channel in the axial direction, a second rotate channel separate from the first rotate channel and first locking channel and transverse to the hinge axis at a second portion of the central lock cylinder, and a second locking channel extending from the second rotate channel in the axial direction;
- an intermediate hinge cylinder positioned about the central lock cylinder and axially translatable relative to the central hinge cylinder, the intermediate hinge cylinder including: (1) a first slot opening associated with the first rotate channel of the central lock cylinder, the first slot opening having an angular length less than or equal to an angular length of the first rotate channel of the central lock cylinder, (2) a second slot opening associated with the second rotate channel of the central lock cylinder, the second slot opening having an angular length less than or equal to an angular length of the second rotate channel of the central lock cylinder;
- at least three separate flats coupled with the central lock cylinder;
- at least two of the three flats rotatably coupled with the central lock cylinder via a first collar and a second collar, respectively, the first collar coupled with the central lock cylinder along the first portion of the elongate length of the central lock cylinder, the first collar comprising a first collar pin protruding inwardly from the first collar through the first slot opening of the intermediate hinge cylinder and into the first rotate channel of the central lock cylinder, the second collar comprising a second collar pin protruding inwardly from the second collar through the second slot opening of the intermediate hinge cylinder and into the second rotate channel of the central lock cylinder;
- wherein the intermediate hinge cylinder reduces binding of the first and second collar pins of the first and second collar on the central lock cylinder about the axis of the central lock cylinder;
- wherein the first collar pin of the first collar cooperates with the first rotate channel to limit movement between the first collar and the central lock cylinder in the axial direction;
- wherein the first collar has a first predetermined rotational range of motion about the hinge axis relative to the central lock cylinder when the first collar pin is positioned in the first rotate channel;
- wherein the second collar pin of the second collar cooperates with the second rotate channel to limit movement between the second collar and the central lock cylinder in the axial direction;
- wherein the second collar has a second predetermined rotational range of motion about the hinge axis relative to the central lock cylinder when the second collar pin is positioned in the second rotate channel;
- wherein the first predetermined rotational range of motion is different than the second predetermined rotational range of motion;
- wherein, when the first collar pin of the first collar is rotationally aligned with the first locking channel and the second collar pin of the second collar is rotationally aligned with the second locking channel, the central lock cylinder is movable in the axial direction relative to the first collar, the second collar, and the intermediate hinge cylinder to transition the hinge mechanism into a first locking configuration where at least a portion of the first collar pin of the first collar is positioned within the first locking channel and at least a portion of the second collar pin of the second collar is positioned within the second locking channel; and
- wherein the first locking configuration reduces a rotational range of motion between the central locking cylinder, the first collar, and the second collar.

12. The hinge mechanism of claim 11, wherein one of the at least three flats is integrally formed with the central lock cylinder.

13. The hinge mechanism of claim 11,
- wherein the central lock cylinder further includes:
  - a third rotate channel transverse to the hinge axis at a third portion of the elongate length of the central lock cylinder;
  - a fourth rotate channel transverse to the hinge axis at a fourth portion of the elongate length of the cylinder hinge;
  - a third locking channel extending from the third rotate channel in the axial direction; and
  - a fourth locking channel extending from the fourth rotate channel in the axial direction;
- wherein the at least three separate flats comprises a first flat, a second flat, a third flat, and a fourth flat;
- wherein the first flat couples with the first collar;
- wherein the second flat couples along the second portion of the central lock cylinder via the second collar;
- wherein the third flat couples along the third portion of the central lock cylinder via a third collar, the third collar including a third collar pin protruding inwardly from the third collar and into the third rotate channel of the central lock cylinder;
- wherein the fourth flat couples along the fourth portion of the central lock cylinder via a fourth collar, the fourth collar including a fourth collar pin protruding inwardly from the fourth collar and into the fourth rotate channel of the central lock cylinder; and
- wherein the hinge mechanism has a deployed configuration, the hinge mechanism being in the deployed configuration when the first collar pin, the second collar pin, the third collar pin, and the fourth collar pin are rotatably aligned with and/or positioned in the first locking channel, the second locking channel, the third locking channel, and the fourth locking channel, respectively.

14. A hinge mechanism comprising:
- a central cylinder having an elongate length defining a hinge axis;
- a first collar disposed about the central cylinder, the first collar comprising:
  - a first rotate channel transverse to the hinge axis, the first rotate channel including a first end and a second end and an angular length therebetween;
  - a first locking channel extending from the first rotate channel in an axial direction;
- a second collar disposed about the central cylinder, the second collar comprising:
  - a second rotate channel transverse to the hinge axis, the second rotate channel including a first end and a second end and an angular length therebetween;
  - a second locking channel extending from the second rotate channel in the axial direction;

an intermediate cylinder positioned between the central cylinder and the first and second collars, the intermediate cylinder rotatable relative to the central cylinder about the hinge axis and axially translatable relative to the central cylinder along the hinge axis, the intermediate cylinder including (1) a first slot opening associated with the first rotate channel of the first collar, the first slot opening having an angular length less than or equal to the angular length of the first rotate channel of the first collar, and (2) a second slot opening associated with the second rotate channel of the second collar, the second slot opening having an angular length less than or equal to the angular length of the second rotate channel of the second collar;

wherein the central cylinder includes a first stud protruding outwardly from a surface of the central cylinder through the first slot opening of the intermediate hinge cylinder and into the first rotate channel or the first lock channel of the first collar, and wherein the central cylinder includes a second stud protruding outwardly from the surface of the central cylinder through the second slot opening of the intermediate hinge cylinder and into the second rotate channel or the second lock channel of the second collar;

wherein the intermediate hinge cylinder reduces binding of the first and second studs of the central lock cylinder with first rotate channel of the first collar and with the second rotate channel of the second collar, respectively;

wherein the first stud of the central cylinder cooperates with the first rotate channel to limit an axial range of movement between the first collar and the central cylinder in the axial direction;

wherein the first collar has a rotational range of motion about the hinge axis relative to the central cylinder when the first stud is positioned within the first rotate channel of the first collar; and wherein the second stud of the central cylinder cooperates with the second rotate channel to limit an axial range of movement between the second collar and the central cylinder in the axial direction;

wherein the second collar has a rotational range of motion about the hinge axis relative to the central cylinder when the second stud is positioned within the second rotate channel of the second collar;

wherein the rotational range of motion of the second collar is different than the rotational range of motion of the first collar;

wherein, when the first stud of the central cylinder is rotationally aligned with the first locking channel and the second stud of the central cylinder is rotationally aligned with the second locking channel, the central cylinder is movable in the axial direction relative to the first collar, the second collar, and the intermediate hinge cylinder to transition the hinge mechanism into a locking configuration where at least a portion of the first stud of the central cylinder is positioned within the first locking channel of the first collar and where at least a portion of the second stud of the central cylinder is positioned within the second locking channel of the second collar; and wherein, when the portion of the first stud of the central cylinder is positioned within the first locking channel, the rotational range of motion of the first collar about the hinge axis relative to the central cylinder is reduced and when the portion of the second stud of the central cylinder is positioned within the second locking channel, the rotational range of motion of the second collar about the hinge axis relative to the central cylinder is reduced.

15. A furniture unit comprising the hinge mechanism of claim 14.

* * * * *